(12) United States Patent
Abolfathi et al.

(10) Patent No.: US 8,433,083 B2
(45) Date of Patent: Apr. 30, 2013

(54) DENTAL BONE CONDUCTION HEARING APPLIANCE

(75) Inventors: Amir A. Abolfathi, Woodside, CA (US); John Spiridigliozzi, San Mateo, CA (US)

(73) Assignee: Sonitus Medical, Inc., San Mateo, CA (US)

( * ) Notice: Subject to any disclaimer, the term of this patent is extended or adjusted under 35 U.S.C. 154(b) by 114 days.

(21) Appl. No.: 13/108,372

(22) Filed: May 16, 2011

(65) Prior Publication Data

US 2011/0280416 A1 Nov. 17, 2011

Related U.S. Application Data

(63) Continuation of application No. 12/333,279, filed on Dec. 11, 2008, now Pat. No. 7,945,068, which is a continuation of application No. 12/042,186, filed on Mar. 4, 2008, now abandoned.

(51) Int. Cl.
*H04R 25/00* (2006.01)

(52) U.S. Cl.
USPC ............ 381/151; 381/322; 381/326; 381/380

(58) Field of Classification Search .................. 381/151, 381/322, 324, 326, 331, 380; 600/25; 607/56–57; 181/128
See application file for complete search history.

(56) References Cited

U.S. PATENT DOCUMENTS

| | | | |
|---|---|---|---|
| 2,045,404 A | 6/1936 | Nicholides | |
| 2,161,169 A | 6/1939 | Jefferis | |
| 2,239,550 A * | 4/1941 | Cubert | 381/326 |
| 2,318,872 A | 5/1943 | Madiera | |
| 2,977,425 A | 3/1961 | Cole | |
| 2,995,633 A | 8/1961 | Puharich et al. | |
| 3,156,787 A | 11/1964 | Puharich et al. | |
| 3,170,993 A | 2/1965 | Puharich et al. | |
| 3,267,931 A | 8/1966 | Puharich et al. | |
| 3,325,743 A | 6/1967 | Blum | |
| 3,787,641 A | 1/1974 | Santori | |
| 3,894,196 A | 7/1975 | Briskey | |
| 3,985,977 A | 10/1976 | Beaty et al. | |
| 4,025,732 A | 5/1977 | Traunmuller | |
| 4,150,262 A | 4/1979 | Ono | |
| 4,498,461 A | 2/1985 | Hakansson | |

(Continued)

FOREIGN PATENT DOCUMENTS

| | | |
|---|---|---|
| EP | 0715838 A2 | 6/1996 |
| EP | 0741940 A1 | 11/1996 |

(Continued)

OTHER PUBLICATIONS

"Special Forces Smart Noise Cancellation Ear Buds with Built-In GPS," http://www.gizmag.com/special-forces-smart-noise-cancellation-ear-buds-with-built-in-gps/9428/, 2 pages, 2008.

(Continued)

*Primary Examiner* — Suhan Ni

(74) *Attorney, Agent, or Firm* — Levine Bagade Han LLP

(57) ABSTRACT

An intra-oral hearing appliance includes an actuator to provide bone conduction sound transmission; a transceiver coupled to the actuator to cause the actuator to generate sound; and a first chamber containing the actuator and the transceiver, said first chamber adapted to be coupled to one or more teeth.

21 Claims, 23 Drawing Sheets

U.S. PATENT DOCUMENTS

| | | |
|---|---|---|
| 4,591,668 A | 5/1986 | Iwata |
| 4,612,915 A | 9/1986 | Hough et al. |
| 4,642,769 A | 2/1987 | Petrofsky |
| 4,738,268 A | 4/1988 | Kipnis |
| 4,817,044 A | 3/1989 | Ogren |
| 4,832,033 A | 5/1989 | Maher et al. |
| 4,920,984 A | 5/1990 | Furumichi et al. |
| 4,982,434 A | 1/1991 | Lenhardt et al. |
| 5,012,520 A | 4/1991 | Steeger |
| 5,033,999 A | 7/1991 | Mersky |
| 5,047,994 A | 9/1991 | Lenhardt et al. |
| 5,060,526 A | 10/1991 | Barth et al. |
| 5,082,007 A | 1/1992 | Adell |
| 5,233,987 A | 8/1993 | Fabian et al. |
| 5,323,468 A | 6/1994 | Bottesch |
| 5,325,436 A | 6/1994 | Soli et al. |
| 5,372,142 A | 12/1994 | Madsen et al. |
| 5,402,496 A | 3/1995 | Soli et al. |
| 5,403,262 A | 4/1995 | Gooch |
| 5,447,489 A | 9/1995 | Issalene et al. |
| 5,455,842 A | 10/1995 | Merskey et al. |
| 5,460,593 A | 10/1995 | Mersky et al. |
| 5,546,459 A | 8/1996 | Sih et al. |
| 5,558,618 A | 9/1996 | Maniglia |
| 5,565,759 A | 10/1996 | Dunstan |
| 5,616,027 A | 4/1997 | Jacobs et al. |
| 5,624,376 A | 4/1997 | Ball et al. |
| 5,661,813 A | 8/1997 | Shimauchi et al. |
| 5,706,251 A | 1/1998 | May |
| 5,760,692 A | 6/1998 | Block |
| 5,800,336 A | 9/1998 | Ball et al. |
| 5,812,496 A | 9/1998 | Peck |
| 5,828,765 A | 10/1998 | Gable |
| 5,902,167 A | 5/1999 | Filo et al. |
| 5,914,701 A | 6/1999 | Gersheneld et al. |
| 5,961,443 A | 10/1999 | Rastatter et al. |
| 5,984,681 A | 11/1999 | Huang |
| 6,029,558 A | 2/2000 | Stevens et al. |
| 6,047,074 A | 4/2000 | Zoels et al. |
| 6,068,590 A | 5/2000 | Brisken |
| 6,072,884 A | 6/2000 | Kates |
| 6,072,885 A | 6/2000 | Stockham, Jr. et al. |
| 6,075,557 A | 6/2000 | Holliman et al. |
| 6,115,477 A | 9/2000 | Filo et al. |
| 6,118,882 A | 9/2000 | Haynes |
| 6,171,229 B1 | 1/2001 | Kroll et al. |
| 6,223,018 B1 | 4/2001 | Fukumoto et al. |
| 6,239,705 B1 | 5/2001 | Glen |
| 6,333,269 B2 | 12/2001 | Naito et al. |
| 6,371,758 B1 | 4/2002 | Kittelsen |
| 6,377,693 B1 | 4/2002 | Lippa et al. |
| 6,394,969 B1 | 5/2002 | Lenhardt |
| 6,504,942 B1 | 1/2003 | Hong et al. |
| 6,538,558 B2 | 3/2003 | Sakazume et al. |
| 6,585,637 B2 | 7/2003 | Brillhart et al. |
| 6,631,197 B1 | 10/2003 | Taenzer |
| 6,633,747 B1 | 10/2003 | Reiss |
| 6,682,472 B1 | 1/2004 | Davis |
| 6,754,472 B1 | 6/2004 | Williams et al. |
| 6,778,674 B1 | 8/2004 | Panasik et al. |
| 6,826,284 B1 | 11/2004 | Benesty et al. |
| 6,885,753 B2 | 4/2005 | Bank |
| 6,917,688 B2 | 7/2005 | Yu et al. |
| 6,941,952 B1 | 9/2005 | Rush, III |
| 6,954,668 B1 | 10/2005 | Cuozzo |
| 6,985,599 B2 | 1/2006 | Asnes |
| 7,003,099 B1 | 2/2006 | Zhang et al. |
| 7,033,313 B2 | 4/2006 | Lupin et al. |
| 7,035,415 B2 | 4/2006 | Belt et al. |
| 7,074,222 B2 | 7/2006 | Westerkull |
| 7,076,077 B2 | 7/2006 | Atsumi et al. |
| 7,099,822 B2 | 8/2006 | Zangi |
| 7,162,420 B2 | 1/2007 | Zangi et al. |
| 7,171,003 B1 | 1/2007 | Venkatesh et al. |
| 7,171,008 B2 | 1/2007 | Elko |
| 7,174,022 B1 | 2/2007 | Zhang et al. |
| 7,206,423 B1 | 4/2007 | Feng et al. |
| 7,246,058 B2 | 7/2007 | Burnett |
| 7,258,533 B2 | 8/2007 | Tanner et al. |
| 7,269,266 B2 | 9/2007 | Anjanappa et al. |
| 7,271,569 B2 | 9/2007 | Oglesbee |
| 7,310,427 B2 | 12/2007 | Retchin et al. |
| 7,329,226 B1 | 2/2008 | Ni et al. |
| 7,331,349 B2 | 2/2008 | Brady et al. |
| 7,333,624 B2 | 2/2008 | Husung |
| 7,361,216 B2 | 4/2008 | Kangas et al. |
| 7,409,070 B2 | 8/2008 | Pitulia |
| 7,486,798 B2 | 2/2009 | Anjanappa et al. |
| 7,520,851 B2 | 4/2009 | Davis et al. |
| 7,522,738 B2 | 4/2009 | Miller, III |
| 7,522,740 B2 | 4/2009 | Julstrom et al. |
| 7,945,068 B2 | 5/2011 | Abolfathi et al. |
| 2001/0003788 A1 | 6/2001 | Ball et al. |
| 2001/0051776 A1 | 12/2001 | Lenhardt |
| 2002/0026091 A1 | 2/2002 | Leysieffer |
| 2002/0071581 A1 | 6/2002 | Leysieffer et al. |
| 2002/0077831 A1 | 6/2002 | Numa |
| 2002/0122563 A1 | 9/2002 | Schumaier |
| 2002/0173697 A1 | 11/2002 | Lenhardt |
| 2003/0059078 A1 | 3/2003 | Downs et al. |
| 2003/0091200 A1 | 5/2003 | Pompei |
| 2003/0212319 A1 | 11/2003 | Magill |
| 2004/0057591 A1 | 3/2004 | Beck et al. |
| 2004/0131200 A1 | 7/2004 | Davis |
| 2004/0141624 A1 | 7/2004 | Davis et al. |
| 2004/0202339 A1 | 10/2004 | O'Brien, Jr. et al. |
| 2004/0202344 A1 | 10/2004 | Anjanappa et al. |
| 2004/0243481 A1 | 12/2004 | Bradbury et al. |
| 2004/0247143 A1 | 12/2004 | Lantrua et al. |
| 2005/0037312 A1 | 2/2005 | Uchida |
| 2005/0067816 A1 | 3/2005 | Buckman |
| 2005/0070782 A1 | 3/2005 | Brodkin |
| 2005/0129257 A1 | 6/2005 | Tamura |
| 2005/0196008 A1 | 9/2005 | Anjanappa et al. |
| 2005/0241646 A1 | 11/2005 | Sotos et al. |
| 2006/0008106 A1 | 1/2006 | Harper |
| 2006/0025648 A1 | 2/2006 | Lupin et al. |
| 2006/0064037 A1 | 3/2006 | Shalon et al. |
| 2006/0167335 A1 | 7/2006 | Park et al. |
| 2006/0207611 A1 | 9/2006 | Anonsen |
| 2006/0270467 A1 | 11/2006 | Song et al. |
| 2006/0275739 A1 | 12/2006 | Ray |
| 2007/0010704 A1 | 1/2007 | Pitulia |
| 2007/0036370 A1 | 2/2007 | Granovetter et al. |
| 2007/0041595 A1 | 2/2007 | Carazo et al. |
| 2007/0142072 A1 | 6/2007 | Lassally |
| 2007/0183613 A1 | 8/2007 | Juneau et al. |
| 2007/0230713 A1 | 10/2007 | Davis |
| 2007/0242835 A1 | 10/2007 | Davis |
| 2007/0265533 A1 | 11/2007 | Tran |
| 2007/0276270 A1 | 11/2007 | Tran |
| 2007/0280491 A1 | 12/2007 | Abolfathi |
| 2007/0280492 A1 | 12/2007 | Abolfathi |
| 2007/0280493 A1 | 12/2007 | Abolfathi |
| 2007/0280495 A1 | 12/2007 | Abolfathi |
| 2007/0286440 A1 | 12/2007 | Abolfathi et al. |
| 2007/0291972 A1 | 12/2007 | Abolfathi et al. |
| 2008/0019542 A1 | 1/2008 | Menzel et al. |
| 2008/0019557 A1 | 1/2008 | Bevirt et al. |
| 2008/0021327 A1 | 1/2008 | El-Bialy et al. |
| 2008/0064993 A1 | 3/2008 | Abolfathi et al. |
| 2008/0070181 A1 | 3/2008 | Abolfathi et al. |
| 2008/0304677 A1 | 12/2008 | Abolfathi et al. |
| 2009/0028352 A1 | 1/2009 | Petroff |
| 2009/0052698 A1 | 2/2009 | Rader et al. |
| 2009/0088598 A1 | 4/2009 | Abolfathi |
| 2009/0097684 A1 | 4/2009 | Abolfathi et al. |
| 2009/0097685 A1 | 4/2009 | Menzel et al. |
| 2009/0099408 A1 | 4/2009 | Abolfathi et al. |
| 2009/0105523 A1 | 4/2009 | Kassayan et al. |
| 2009/0147976 A1 | 6/2009 | Abolfathi |
| 2009/0149722 A1 | 6/2009 | Abolfathi et al. |
| 2009/0180652 A1 | 7/2009 | Davis et al. |
| 2009/0220921 A1 | 9/2009 | Abolfathi et al. |
| 2009/0226011 A1 | 9/2009 | Abolfathi et al. |
| 2009/0226017 A1 | 9/2009 | Abolfathi et al. |

FOREIGN PATENT DOCUMENTS

| | | |
|---|---|---|
| EP | 0824889 A1 | 2/1998 |
| EP | 1299052 A1 | 2/2002 |
| EP | 1633284 A1 | 12/2004 |
| EP | 1691686 A1 | 8/2006 |
| EP | 1718255 A1 | 11/2006 |
| EP | 1783919 A1 | 5/2007 |
| GB | 2467053 A | 7/2010 |
| JP | 2007028248 A2 | 2/2007 |
| JP | 2007028610 A2 | 2/2007 |
| JP | 2007044284 A2 | 2/2007 |
| JP | 2007049599 A2 | 2/2007 |
| JP | 2007049658 A2 | 2/2007 |
| WO | WO 83/02047 | 6/1983 |
| WO | WO 91/02678 | 3/1991 |
| WO | WO 95/19678 | 7/1995 |
| WO | WO 96/21335 | 7/1996 |
| WO | WO 02/09622 | 2/2002 |
| WO | WO 2004/045242 | 5/2004 |
| WO | WO 2004/105650 | 12/2004 |
| WO | WO 2005/000391 | 1/2005 |
| WO | WO 2005/037153 | 4/2005 |
| WO | WO 2005/053533 | 6/2005 |
| WO | WO 2006/088410 | 8/2006 |
| WO | WO 2006/130909 | 12/2006 |
| WO | WO 2007/043055 | 4/2007 |
| WO | WO 2007/052251 | 5/2007 |
| WO | WO 2007/059185 | 5/2007 |
| WO | WO 2007/140367 | 12/2007 |
| WO | WO 2007/140368 | 12/2007 |
| WO | WO 2007/140373 | 12/2007 |
| WO | WO 2007/143453 | 12/2007 |
| WO | WO 2008/024794 | 2/2008 |
| WO | WO 2008/030725 | 3/2008 |
| WO | WO 2009/014812 | 1/2009 |
| WO | WO 2009/025917 | 2/2009 |
| WO | WO 2009/066296 | 5/2009 |
| WO | WO 2009/102889 | 8/2009 |
| WO | WO 2009/111404 | 9/2009 |
| WO | WO 2009/111566 | 9/2009 |
| WO | WO 2010/085455 | 7/2010 |

OTHER PUBLICATIONS

Altmann, et al. Foresighting the new technology waves—Exper Group. In: State of the Art Reviews and Related Papers—Center on Nanotechnology and Society. 2004 Conference. Published Jun. 14, 2004. p. 1-291. Available at http://www.nano-and-society.org.

Berard, G., "Hearing Equals Behavior" [summary], 1993, http://www.bixby.org/faq/tinnitus/treatment.html.

Britsh Patent Application No. 1000894.4 filed Jan. 20, 2010 in the name of Abolfathi et al., Search Report mailed Mar. 26, 2010.

Broyhill, D., "Battlefield Medical Information System—Telemedicine," A research paper presented to the U.S. Army Command and General Staff College in partial Fulfillment of the requirement for A462 Combat Health Support Seminar, 12 pages, 2003.

Dental Cements—Premarket Notification, U.S. Department of Health and Human Services Food and Drug Administration Center for Devices and Radiological Health, pp. 1-10, Aug. 18, 1998.

Henry, et al. "Comparison of Custom Sounds for Achieving Tinnitus Relief," *J Am Acad Audiol*, 15:585-598, 2004.

Jastreboff, Pawel, J., "Phantom auditory perception (tinnitus): mechanisms of generation and perception," *Neuroscience Research*, 221-254, 1990, Elsevier Scientific Publishers Ireland, Ltd.

PCT Patent Application No. PCT/US2009/036038 filed Mar. 4, 2009 in the name of Abolfathi et al., International Search Report and Written Opinion mailed Apr. 20, 2009.

PCT Patent Application No. PCT/US2010/021427 filed Jan. 19, 2010 in the name of Abolfathi et al., International Search Report and Written Opinion mailed Mar. 23, 2010.

Robb, "Tinnitus Device Directory Part I," *Tinnitus Today*, p. 22, Jun. 2003.

Song, S. et al., "A 0.2-mW 2-Mb/s Digital Transceiver Based on Wideband Signaling for Human Body Communications," *IEEE J Solid-State Cir*, 42(9), 2021-2033, Sep. 2007.

Stuart, A., et al., "Investigations of the Impact of Altered Auditory Feedback In-The-Ear Devices on the Speech of People Who Stutter: Initial Fitting and 4-Month Follow-Up"*Int J Lang Commun Disord*, 39(1), Jan. 2004, [abstract only].

Wen, Y. et al, "Online Prediction of Battery Lifetime for Embedded and Mobile Devices," Special Issue on Embedded Systems: Springer-Verlag Heidelberg Lecture Notes in Computer Science, V3164/2004, 15 pages, Dec. 2004.

U.S. Appl. No. 11/754,823, filed May 29, 2007 in the name of Abolfathi et al., Final Office Action mailed May 12, 2009.

U.S. Appl. No. 11/754,823, filed May 29, 2007 in the name of Abolfathi et al., Non-final Office Action mailed Aug. 14, 2008.

U.S. Appl. No. 11/754,833, filed May 29, 2007 in the name of Abolfathi et al., Final Office Action mailed May 14, 2009.

U.S. Appl. No. 11/754,833, filed May 29, 2007 in the name of Abolfathi et al., Non-final Office Action mailed Aug. 6, 2008.

U.S. Appl. No. 11/672,239, filed Feb. 7, 2007 in the name of Abolfathi, Non-final Office Action mailed Jun. 18, 2009.

U.S. Appl. No. 11/672,239, filed Feb. 7, 2007 in the name of Abolfathi, Non-final Office Action mailed Nov. 13, 2008.

U.S. Appl. No. 11/672,250, filed Feb. 7, 2007 in the name of Abolfathi, Non-final Office Action mailed Apr. 21, 2009.

U.S. Appl. No. 11/672,250, filed Feb. 7, 2007 in the name of Abolfathi, Non-final Office Action mailed Aug. 8, 2008.

U.S. Appl. No. 11/672,264, filed Feb. 7, 2007 in the name of Abolfathi, Non-Final Rejection mailed Apr. 28, 2009.

U.S. Appl. No. 11/672,264, filed Feb. 7, 2007 in the name of Abolfathi, Non-Final Rejection mailed Aug. 6, 2008.

U.S. Appl. No. 11/672,271, filed Feb. 7, 2007 in the name of Abolfathi, Final Office Action mailed May 18, 2009.

U.S. Appl. No. 11/672,271, filed Feb. 7, 2007 in the name of Abolfathi, Non-final Office Action mailed Aug. 20, 2008.

U.S. Appl. No. 11/741,648, filed Apr. 27, 2007 in the name of Menzel et al., Final Office Action mailed May 18, 2009.

U.S. Appl. No. 11/741,648, filed Apr. 27, 2007 in the name of Menzel et al., Non-final Office Action mailed Sep. 4, 2008.

U.S. Appl. No. 11/866,345, filed May 29, 2007 in the name of Abolfathi et al., Final Office Action mailed Apr. 15, 2009.

U.S. Appl. No. 11/866,345, filed May 29, 2007 in the name of Abolfathi et al., Non-final Office Action mailed Mar. 19, 2008.

U.S. Appl. No. 12/042,186, filed Mar. 4, 2008 in the name of Abolfathi et al., non-final Office Action mailed Sep. 29, 2010.

U.S. Appl. No. 12/333,279, filed Dec. 11, 2008 in the name of Abolfathi et al., final Office Action mailed Jan. 10, 2011.

U.S. Appl. No. 12/333,279, filed Dec. 11, 2008 in the name of Abolfathi et al., non-final Office Action mailed Sep. 27, 2010.

U.S. Appl. No. 12/333,279, filed Dec. 11, 2008 in the name of Abolfathi et al., Notice of Allowance mailed Mar. 29, 2011.

* cited by examiner

DENTAL BONE CONDUCTION HEARING APPLIANCE

CROSS-REFERENCE TO RELATED APPLICATIONS

This application is a continuation of U.S. application Ser. No. 12/333,279 filed Dec. 11, 2008 which is a continuation of U.S. application Ser. No. 12/042,186 filed Mar. 4, 2008, now abandoned, both of which are incorporated herein by reference in their entirety.

BACKGROUND OF THE INVENTION

Hearing loss affects over 31 million people in the United States. As a chronic condition, the incidence of hearing impairment rivals that of heart disease and, like heart disease, the incidence of hearing impairment increases sharply with age.

Hearing loss can also be classified in terms of being conductive, sensorineural, or a combination of both. Conductive hearing impairment typically results from diseases or disorders that limit the transmission of sound through the middle ear. Most conductive impairments can be treated medically or surgically. Purely conductive hearing loss represents a relatively small portion of the total hearing impaired population.

Sensorineural hearing losses occur mostly in the inner ear and account for the vast majority of hearing impairment (estimated at 90-95% of the total hearing impaired population). Sensorineural hearing impairment (sometimes called "nerve loss") is largely caused by damage to the sensory hair cells inside the cochlea. Sensorineural hearing impairment occurs naturally as a result of aging or prolonged exposure to loud music and noise. This type of hearing loss cannot be reversed nor can it be medically or surgically treated; however, the use of properly fitted hearing devices can improve the individual's quality of life.

Conventional hearing devices are the most common devices used to treat mild to severe sensorineural hearing impairment. These are acoustic devices that amplify sound to the tympanic membrane. These devices are individually customizable to the patient's physical and acoustical characteristics over four to six separate visits to an audiologist or hearing instrument specialist. Such devices generally comprise a microphone, amplifier, battery, and speaker. Recently, hearing device manufacturers have increased the sophistication of sound processing, often using digital technology, to provide features such as programmability and multi-band compression. Although these devices have been miniaturized and are less obtrusive, they are still visible and have major acoustic limitation.

In a parallel trend, the advent of music players and cell phones has driven the demand for small and portable headphones that can reproduce sound with high fidelity so that the user can listen to the sound without disturbing people who are nearby. These headphones typically use small speakers that can render the sound. With cell phones, there is a need to capture the user's voice with a microphone and relay the voice over the cellular network so that the parties can engage in a conversation even though they are separated by great distances. Microphones are transducers just like speakers. They change sound waves into electrical signals, while speakers change electrical signals into sound waves. When a headphone is equipped with a small microphone, it is called a headset.

A headset may be used in conjunction with a telephone device for several reasons. With a headset, the user is relived of the need to hold the phone and thus retains his or her hands free to perform other functions. Headsets also function to position the earphone and microphone portions of a telephone close to the user's head to provide for clearer reception and transmission of audio signals with less interference from background noise. Headsets may be used with telephones, computers, cellular telephones, and other devices.

The wireless industry has launched several after-market products to free the user from holding the phone while making phone calls. For example, various headsets are manufactured with an earpiece connected to a microphone and most of these headsets or hands-free kits are compatible with any phone brand or model. A possible headset can be plugged-in to the phone and comprise a microphone connected via wires to the headset so that the microphone, when in position, can appropriately capture the voice of the user. Other headsets are built in with a Bluetooth chip, or other wireless means, so that the voice conversation can be wirelessly diverted from the phone to the earpiece of the headset. The Bluetooth radio chip acts as a connector between the headset and a Bluetooth chip of the cell-phone.

The ability to correctly identify voiced and unvoiced speech is critical to many speech applications including speech recognition, speaker verification, noise suppression, and many others. In a typical acoustic application, speech from a human speaker is captured and transmitted to a receiver in a different location. In the speaker's environment there may exist one or more noise sources that pollute the speech signal, or the signal of interest, with unwanted acoustic noise. This makes it difficult or impossible for the receiver, whether human or machine, to understand the user's speech.

United States Patent 20080019557 describes a headset which includes a metal or metallic housing to which various accessory components can be attached. These components can include an ear loop, a necklace for the holding of the headset while not being worn on the ear, an external mount, and other components. The components include a magnet which facilitates mounting to the headset. The components are not restricted to a particular attachment point, which enhances the ability of the user to adjust the geometry for better fit.

With conventional headsets, people nearby can notice when the user is wearing the headset. U.S. Pat. No. 7,076,077 discloses a bone conduction headset which is inconspicuous in appearance during wearing. The bone conduction headset includes a band running around a back part of the user's head; a fastening portion formed in each of opposite end portions of the band; a bone conduction speaker provided with a knob which is engaged with the fastening portion; and, an ear engagement portion, which runs over the bone conduction speaker during wearing of the headset to reach and engage with the user's ear. An extension of either the fastening portion in the band or a casing of the bone conduction speaker may be formed into the ear engagement portion.

U.S. Pat. No. 7,246,058 discloses a system for detecting voiced and unvoiced speech in acoustic signals having varying levels of background noise. The systems receive acoustic signals at two microphones, and generate difference parameters between the acoustic signals received at each of the two microphones. The difference parameters are representative of the relative difference in signal gain between portions of the received acoustic signals. The systems identify information of the acoustic signals as unvoiced speech when the difference parameters exceed a first threshold, and identify information of the acoustic signals as voiced speech when the difference parameters exceed a second threshold. Further, embodiments of the systems include non-acoustic sensors that receive physiological information to aid in identifying voiced speech.

SUMMARY

In one aspect, An intra-oral hearing appliance includes an actuator to provide bone conduction sound transmission; a transceiver coupled to the actuator to cause the actuator to generate sound; and a first chamber containing the actuator and the transceiver, said first chamber adapted to be coupled to one or more teeth.

Implementations of the above aspect may include one or more of the following.

An actuator driver or amplifier can be connected to the actuator. A second chamber can be used to house a power source to drive the actuator and the transceiver. A bridge can connect the first and second chambers. The bridge can have electrical cabling or an antenna embedded in the bridge. The bridge can be a wired frame, a polymeric material, or a combination of polymeric material and a wired frame. A mass can be connected to the actuator. The mass can be a weight such as tungsten or a suitable module with a mass such as a battery or an electronics module. The actuator can be a piezoelectric transducer. The configuration of the actuator can be a rectangular or cantilever beam bender configuration. One or more ceramic or alumina stands can connect the actuator to other components. A compressible material can surround the actuator. A non compressible material can cover the actuator and the compressible material. A rechargeable power source can power the transceiver and the actuator. An inductive charger can recharge the battery. The chamber can be a custom oral device. A pre-built housing can be provided for the mass. The pre-built housing can have an arm and one or more bottom contacts, the arm and the contacts adapted to bias a mass against a tooth. A microphone can be connected to the transceiver, the microphone being positioned intraorally or extraorally. A data storage device can be embedded in the appliance. A first microphone can pick up body conduction sound, a second microphone can pick up ambient sound, and a noise canceller can be used to subtract ambient sound from the body conduction sound. The actuator transmits sound through a tooth, a maxillary bone, a mandibular bone, or a palatine bone. A linking unit can provide sound to the transceiver, the linking unit adapted to communicate with an external sound source. The transceiver can be a wired transceiver or a wireless transceiver.

Advantages of preferred embodiments may include one or more of the following. The bone conduction headset is easy to wear and take off in use, and is further inconspicuous in appearance during the user's wearing thereof. The device can be operated without nearby people noticing the user's wearing of the headset. Compared to headphones, the device avoids covering the ears of the listener. This is important if (a) the listener needs to have the ears unobstructed (to allow them to hear other sounds in the environment), or (b) to allow them to plug the ears (to prevent hearing damage from loud sounds in the environment). The system is a multi-purpose communication platform that is rugged, wireless and secure. The device can be used in extreme environments such as very dusty, dirty or wet environments. The system provides quality, hands-free, yet inconspicuous communication capability for field personnel. The system overcomes hearing loss that can adversely affect a person's quality of life and psychological well-being. Solving such hearing impairment leads to reduced stress levels, increases self-confidence, increases sociability and increases effectiveness in the workplace.

DESCRIPTION

Figure 1A:
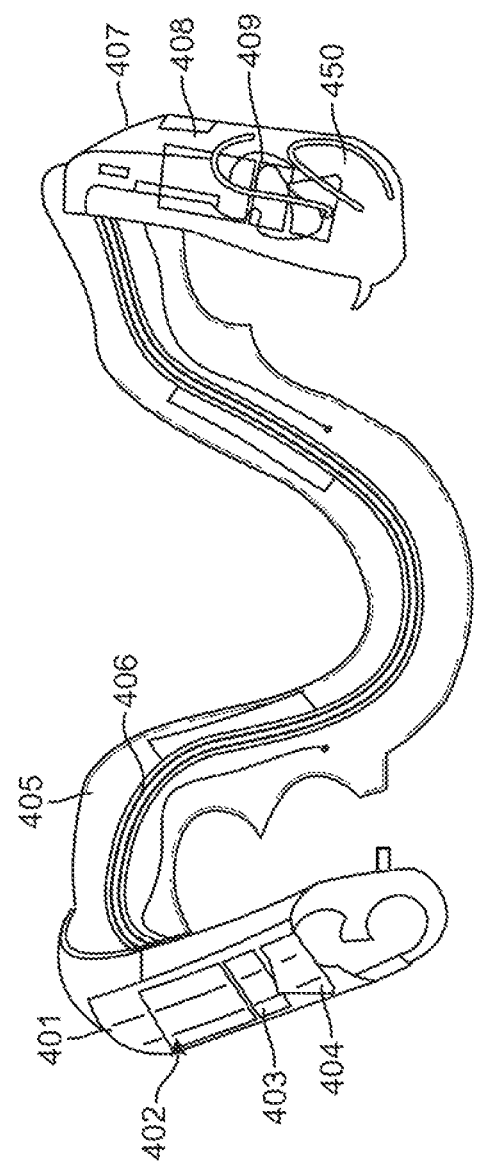
FIG. 1A shows a perspective top view of a bone conduction hearing appliance.

An exemplary removable wireless dental hearing appliance is shown in FIG. 1A. The appliance is worn by a user in his or her oral cavity. The appliance includes a power chamber 401 that supplies energy to power the appliance. The power chamber 401 includes an energy reservoir 402 such as a battery. The battery is charged by charger electronic 403 which can receive external energy through inductive coupling or can directly receive a charge through two terminals. If the charging is to be done inductively, a recharging coil 404 is also enclosed in the power chamber 401.

The power chamber 401 provides energy for electronics in an actuation chamber 407. Mechanically, the chambers 401 and 407 are connected by a bridge 405. Inside the bridge 405 are cables that supply power to the actuation chamber 407. Other devices such as antenna wires can be embedded in the bridge 405. The chambers 401, 407 and the bridge 405 are made from human compatible elastomeric materials commonly used in dental retainers, among others.

Turning now to the actuation chamber 407, an actuator 408 is positioned near the patient's teeth. The actuator 408 is driven by an electronic driver 409. A wireless transceiver 450 provides sound information to the electronic driver 409 so that the driver 409 can actuate the actuator 408 to cause sound to be generated and conducted to the patient's ear through bone conduction in one embodiment. For example, the electronic and actuator assembly may receive incoming sounds either directly or through a receiver to process and amplify the signals and transmit the processed sounds via a vibrating transducer element coupled to a tooth or other bone structure, such as the maxillary, mandibular, or palatine bone structure. Other sound transmission techniques in addition to bone conduction can be used and are contemplated by the inventors.

Figure 1B:
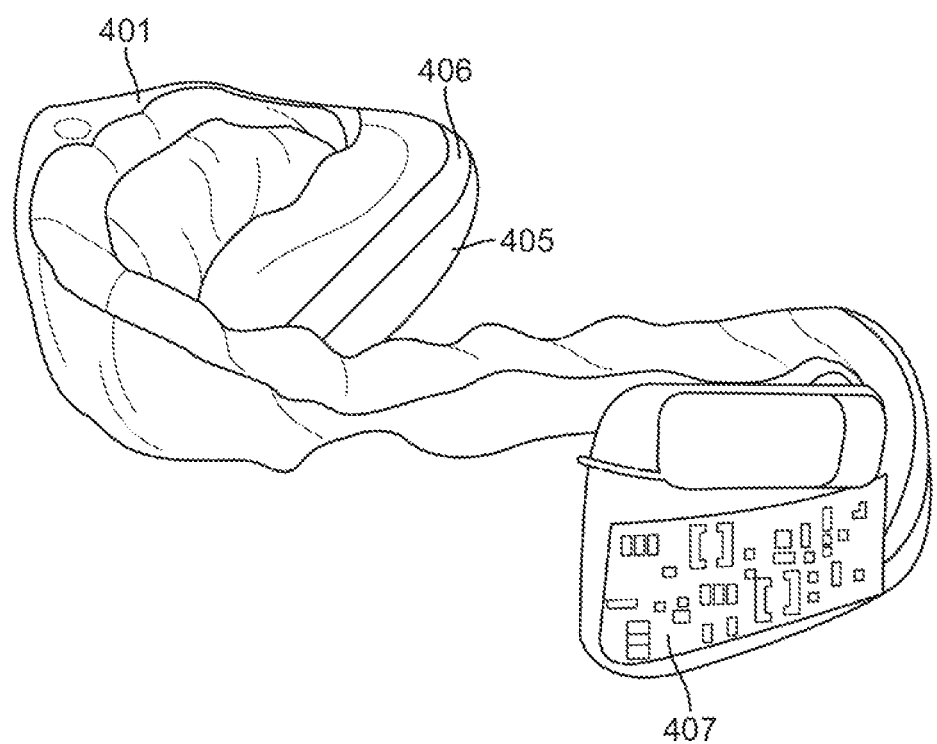
FIG. 1B shows a perspective side view of the appliance of FIG. 1A.

FIG. 1B shows a side perspective view of the appliance of FIG. 1A. The oral appliance of FIG. 1A may be a custom-made device fabricated through a variety of different process utilizing, e.g., a replicate model of a dental structure obtained by any number of methods, as described below in further detail. The oral appliance may accordingly be created to fit, adhere, or be otherwise disposed upon a portion of the patient's dentition to maintain the electronics and transducer device against the patient's dentition securely and comfortably.

Figure 1C:
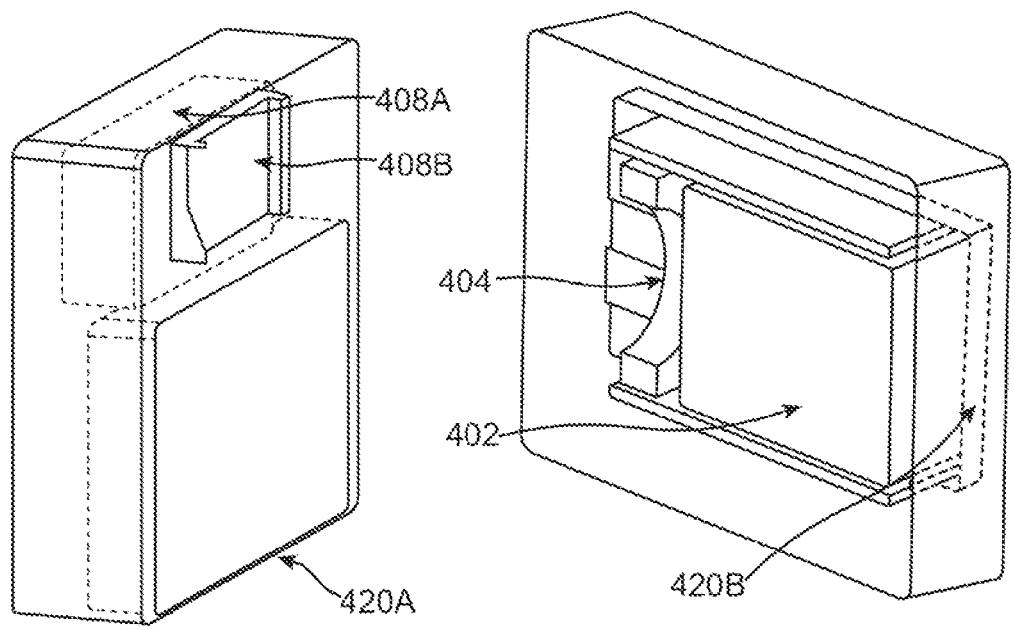
FIG. 1C shows an exemplary mechanical placement of components of each chamber of FIG. 1A.

FIG. 1C shows a perspective view of the electronics housed by the chambers 401 and 407. In the power chamber 401, the recharging coil 404 is positioned at one end and the battery 402 is positioned at the other end of the chamber 401. The control electronics for the charging operation is in a circuit board 420B behind the battery 402 and coil 404.

Correspondingly, in the actuation chamber 407, the actuator 408 in turn is made up of a piezoelectric actuator 408B that moves a mass 408A. The driver 409 and wireless transceiver circuitry are provided on a circuit board 420A.

Figure 2A:
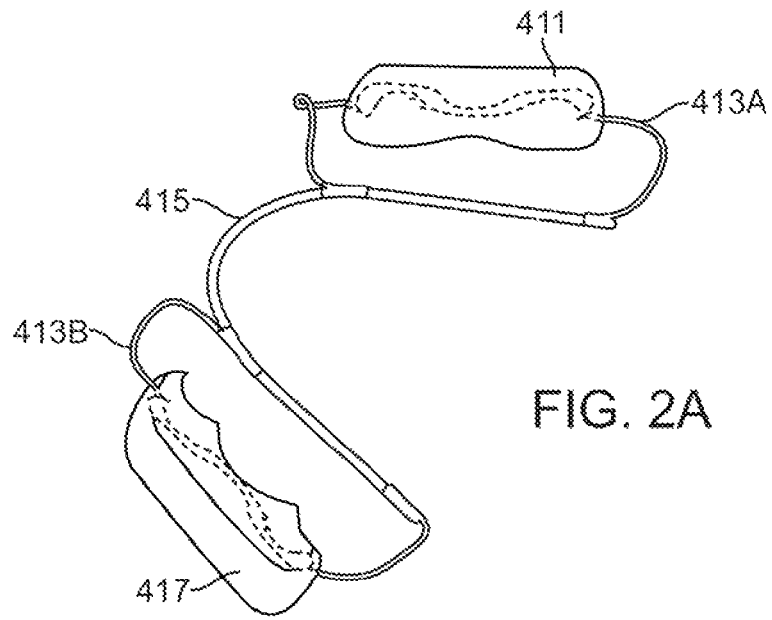
FIG. 2A shows a perspective view of a second embodiment of a hearing appliance.

FIG. 2A shows a second embodiment where the bridge as well as the mechanical supports for the chambers are made from metallic wire frames. As shown in FIG. 2A, chambers 411 and 417 are supported by wire frames 413A and 413B, respectively. The support wire frames 413A-413B are mechanically secured to a main wire frame 415. The cabling for electrical communication between chambers 411 and 417 can be made through wires running along the outside of the wireframes.

Figure 2B:
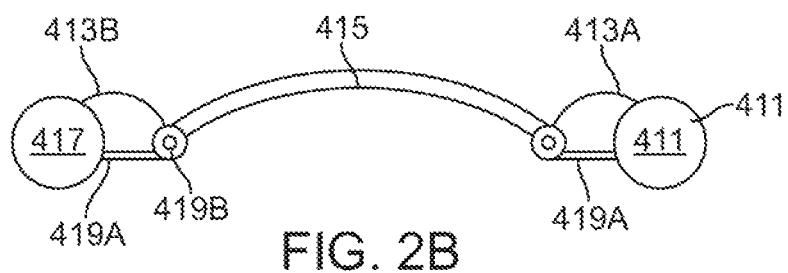
FIG. 2B shows a cross-sectional rear view of the embodiment of FIG. 2A.

FIG. 2B shows one embodiment of FIG. 2A where the main wire frame 415 is hollow to allow wire cabling to run inside the main wire frame 415. In this embodiment, once the cabling exits the main wire frame 415, the wire assembly can be soldered or otherwise connected to electrical contacts on the chambers 411 or 417 as needed to connect circuits between chambers 411 and 417.

Figure 3A:
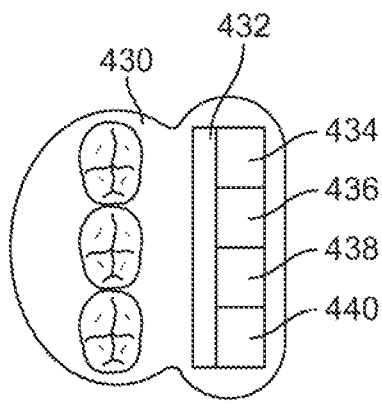
FIG. 3A shows a perspective view of a third embodiment of a hearing appliance.

FIG. 3A shows a third embodiment where the power supply, transceiver, and actuator are housed in a single chamber 430. In this embodiment, the chamber 430 is mounted intra-orally to one or more teeth. An actuator 432 is positioned adjacent the teeth. The actuator 432 can include a mass and a piezoelectric transducer as discussed above. A battery 434 provides power for the whole system and the battery 434 can be recharged through a charger 436. The actuator 432 is driven by an amplifier 438, which receives audio input from a transceiver 440. The transceiver 440 contains an antenna to capture wireless signals transmitted by a remote audio device.

Figure 3B:
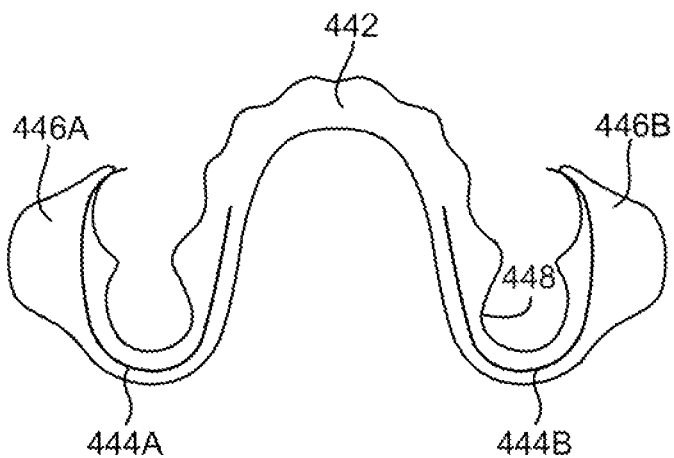
FIG. 3B shows a top view of a fourth embodiment of a hearing appliance.

In one embodiment where the unit is used as a hearing aid, a microphone can provide sound input that is amplified by the amplifier or driver 438. In another embodiment, the system can receive signals from a linking unit such as a Bluetooth transceiver that allows the appliance to play sound generated by a portable appliance or a sound source such as a music player, a hands-free communication device or a cellular telephone, for example. Alternatively, the sound source can be a computer, a one-way communication device, a two-way communication device, or a wireless hands-free communication device FIG. 3B shows a top view of a fourth embodiment of a hearing appliance. The appliance has a body portion 442 that supports two chambers 446A-446B that house the actuator, transceiver, control electronic, and power supply, among others and allows for communication between the two. Two substantially C-shaped support wires 444A and 444B enable the appliance to clip onto the wearer's dental arch around curved regions 448 and to be secured therein. The C-shaped wire 444A or 444B provides a spring force to the actuator to keep it secured to the teeth. The wire material can be stainless steel or Nitinol, among others.

Figure 4:
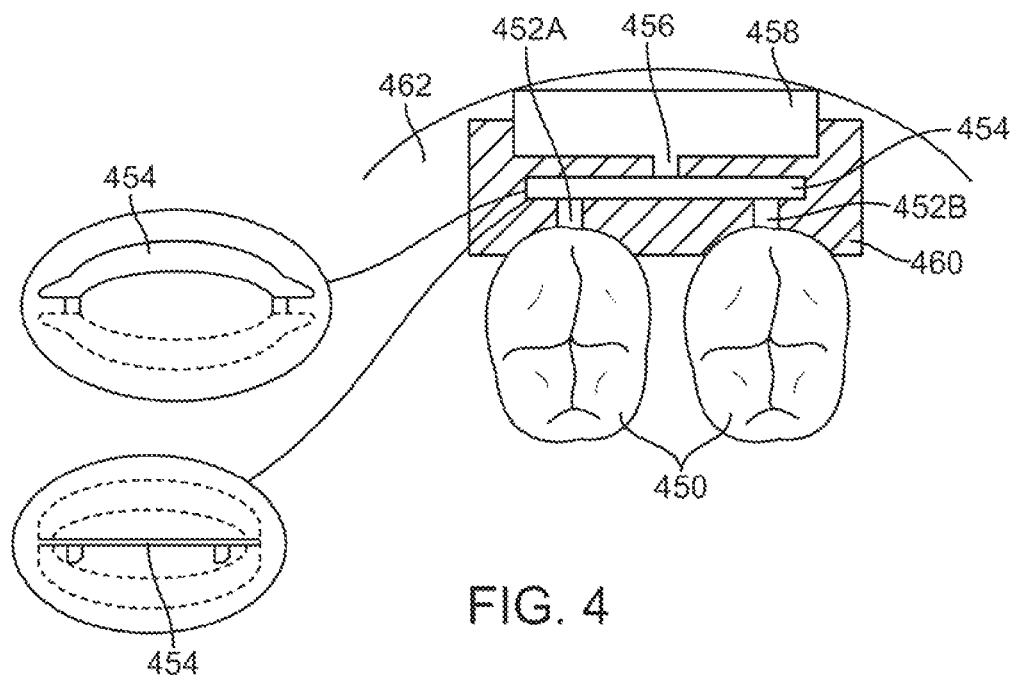
FIG. 4 shows a diagram illustrating the coupling of the actuator to one or more teeth.

FIG. 4 shows an exemplary cross-sectional view showing the coupling of the sound transducer to one or more teeth 450. In FIG. 4, a mounting unit 452 such as a retainer-like housing is placed over one or more teeth 450. The mounting unit 452 can also be adhesive or glue or a suitable system to secure the appliance to the teeth 450. An actuator 454 rests above support arms or links 452A and 452B which are mechanically connected to the teeth 450.

In one embodiment, the actuator 454 is a piezoelectric transducer made with PZT. PZT-based compounds (Pb[ZrxTi1−x]O3 0<x<1, also lead zirconium titanate) are ceramic perovskite materials that develop a voltage difference across two of its facets when highly compressed. Being piezoelectric, it develops a voltage difference across two of its faces when compressed (useful for sensor applications), or physically changes shape when an external electric field is applied (useful for actuators and the like). The material is also ferroelectric, which means it has a spontaneous electric polarization (electric dipole) which can be reversed in the presence of an electric field. The material features an extremely large dielectric constant at the morphotropic phase boundary (MPB) near x=0.52. These properties make PZT-based compounds one of the most prominent and useful electroceramics.

The actuator 454 is also connected to a mass 458 through a mass arm 456. In one embodiment, the actuator 454 uses PZT in a rectangular beam bender configuration. The mass 458 can be a tungsten material or any suitable weight such as the battery or control electronics, among others. The support arms or links 452A-452B as well as the mass arm 456 are preferably made from ceramic or alumina which enables acoustic or sound energy to be efficiently transmitted by the mounting unit 454.

As shown in the two insets, the actuator 454 can be commanded to contract or expand, resulting in movements with upward arch shapes or downward arch shapes. The actuator 454 and its associated components are encapsulated in a compressible material 460 such as silicone to allow actuator movement. In one embodiment, the top of the appliance is provided with an acrylic encapsulated protection layer 462 providing a fixed platform that directs energy generated by the actuator 454 toward the teeth while the compressible material 460 provides room for movement by the actuator 454.

Figure 5:
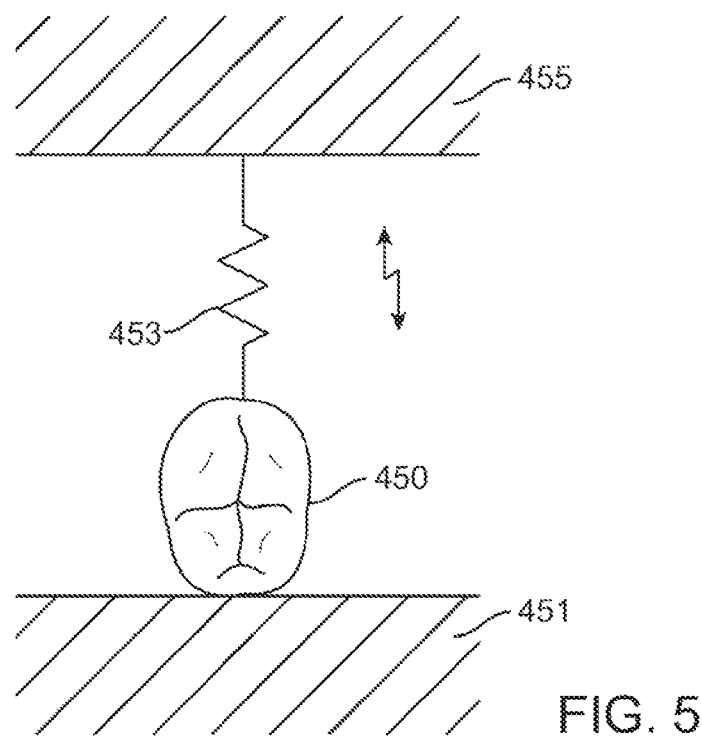
FIG. 5 shows an equivalent model of the coupling of the actuator to the teeth.

FIG. 5 shows a schematic equivalent of the system of FIG. 4. In the model of FIG. 5, a tooth 450 is fixed between bone structure 451 and a mounting unit 455 such as a retainer, both of which are spatially fixed in the model. An actuator 453 provides resistance to drive energy into the tooth 450. Although FIG. 5 shows two fixed point connections, it is contemplated that the actuator 452 can have one fixed point connection as well. This resistance between the tooth and the retainer applies the coupling force necessary to keep the actuator in contact with the tooth at high frequencies.

Figure 6:
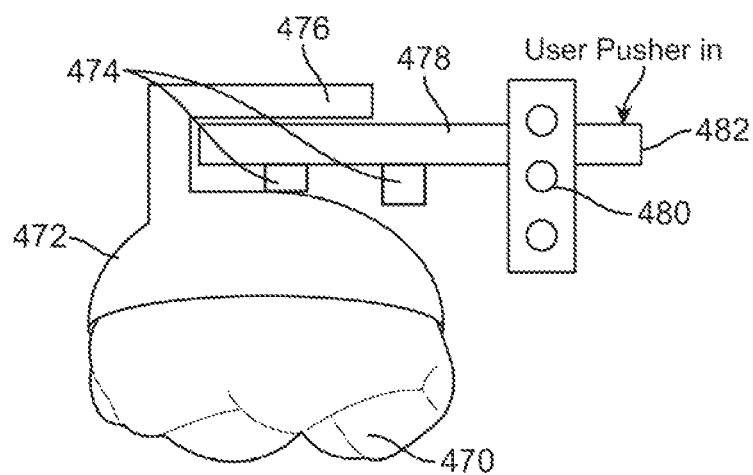
FIG. 6 shows another embodiment to couple the actuator to a tooth.

FIG. 6 shows an exemplary embodiment to mount an actuator or transducer. In this embodiment, a base 472 is secured to a tooth 470. The base has a clip type housing with an top arm 476 and two bottom contacts 474 that together resiliently urge a mass 478 toward the top arm 476. Also positioned on the base 472 is a rod 480 with one or more pins to hold the mass 478 in position similar to a spring that biases the mass 478 against the arm 476 to provide a better contact or coupling between the mass and the tooth 470 through the base 472.

The appliance can be a custom oral device. The sound source unit can contain a short-range transceiver that is protocol compatible with the linking unit. For example, the sound source can have a Bluetooth transceiver that communicates with the Bluetooth transceiver linking unit in the appliance. The appliance can then receive the data transmitted over the Bluetooth protocol and drive a bone conduction transducer to render or transmit sound to the user.

The appliance can have a microphone embedded therein. The microphone can be an intraoral microphone or an extraoral microphone. For cellular telephones and other telephones, a second microphone can be used to cancel environmental noise and transmit a user's voice to the telephone. A noise canceller receives signals from the microphones and cancels ambient noise to provide a clean sound capture.

The appliance can have another microphone to pick up ambient sound. The microphone can be an intraoral microphone or an extraoral microphone. In one embodiment, the microphone cancels environmental noise and transmits a user's voice to the remote station. This embodiment provides the ability to cancel environmental noises while transmitting subject's own voice to the actuator 432. As the microphone is in a fixed location (compared to ordinary wireless communication devices) and very close to user's own voice, the system can handle environmental noise reduction that is important in working in high noise areas.

The system couples microphones and voicing activity sensors to a signal processor. The processor executes a detection algorithm, and a denoising code to minimize background acoustic noise. Two microphones can be used, with one microphone being the bone conduction microphone and one which is considered the "signal" microphone. The second microphone captures air noise or ambient noise, whose signal is filtered and subtracted from the signal in the first microphone. In one embodiment, the system runs an array algorithm for speech detection that uses the difference in frequency content between two microphones to calculate a relationship between the signals of the two microphones. As known in the art and discussed in U.S. Pat. No. 7,246,058, the content of which is incorporated by reference, this embodiment can cancel noise without requiring a specific orientation of the array with respect to the signal.

In another embodiment, the appliance can be attached, adhered, or otherwise embedded into or upon a removable oral appliance or other oral device to form a medical tag containing patient identifiable information. Such an oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

In yet another embodiment, microphones can be place on each side of the ears to provide noise cancellation, optimal sound localization and directionality. The microphones can be placed inside or outside the ears. For example, the microphones can be placed either at the opening or directly with the user's ear canals. Each of the systems includes a battery, a signal processor, a transmitter, all of which can be positioned in a housing that clips onto the ear which, rests behind the ear between the pinna and the skull, or alternatively can be positioned in the ear's concha. The transmitter is connected to a wire/antenna that in turn is connected to the microphone. Each transmitter transmits information to a receiver that activates a transducer that is powered by a battery. Each side of the head can have one set of receiver, transducer and battery. This embodiment provides a bone conduction hearing aid device with dual externally located microphones that are placed at the entrance to or in the ear canals and an oral appliance containing dual transducers in communication with each other. The device will allow the user to enjoy the most natural sound input due to the location of the microphone which takes advantage of the pinna for optimal sound localization (and directionality).

In another embodiment, the microphones receive sound signals from both sides of the head, processes those signals to send a signal to the transducer on the side of the head where the sound is perceived by the microphone to be at a higher sound level. A phase-shifted signal is sent to the transducer on the opposite side of the head. These sounds will then "add" in the cochlea where the sound is louder and "cancel" on the opposite cochlea providing the user with the perception of directionality of the sound.

In yet another embodiment, the microphone at the first ear receives sound signals from the first side of the head, processes those signal to send a signal to the transducer on that same or first side of the oral appliance. A second microphone at the second ear receives a sound signal that is lower in amplitude and delayed in respect to the sound sensed by the first microphone due to head shadowing and physical separation of the microphones, and sends a corresponding signal to the second transducer on the second side of the oral appliance. The sound signals from the transducers will be perceived by each cochlea on each side of the head as being different in amplitude and phase, which will result in the perception of directionality by the user.

In one embodiment where the microphone is mounted in the user's ear canal, components such as the battery, the signal processor, and the transmitter can either be located behind the ear or within the folds of the pinna. The human auricle is an almost rudimentary, usually immobile shell that lies close to the side of the head with a thin plate of yellow fibrocartilage covered by closely adherent skin. The cartilage is molded into clearly defined hollows, ridges, and furrows that form an irregular, shallow funnel. The deepest depression, which leads directly to the external auditory canal, or acoustic meatus, is called the concha. It is partly covered by two small projections, the tonguelike tragus in front and the antitragus behind. Above the tragus a prominent ridge, the helix, arises from the floor of the concha and continues as the incurved rim of the upper portion of the auricle. An inner, concentric ridge, the antihelix, surrounds the concha and is separated from the helix by a furrow, the scapha, also called the fossa of the helix. The lobule, the fleshy lower part of the auricle, is the only area of the outer ear that contains no cartilage. The auricle also has several small rudimentary muscles, which fasten it to the skull and scalp. In most individuals these muscles do not function, although some persons can voluntarily activate them to produce limited movements. The external auditory canal is a slightly curved tube that extends inward from the floor of the concha and ends blindly at the tympanic membrane. In its outer third the wall of the canal consists of cartilage; in its inner two-thirds, of bone. The anthelix (antihelix) is a folded "Y" shaped part of the ear. The antitragus is the lower cartilaginous edge of the conchal bowl just above the fleshy lobule of the ear. The microphone is connected with the transmitter through the wire and antenna. The placement of the microphone inside the ear canal provides the user with the most natural sound input due to the location of the microphone which takes advantage of the pinna for optimal sound localization (and directionality) when the sounds are transmitted to the cochlea using a straight signal and "phase-shifted" signal to apply directionality to the patient. High quality sound input is captured by placing the microphones within or at the entrance of the ear canal which would allow the patient to use the sound reflectivity of the pinna as well as improved sound directionality due to the microphone placement. The arrangement avoids the need to separate the microphone and speaker to reduce the chance of feedback and allows placement of the microphone to take advantage of the sound reflectivity of the pinna. The system also allows for better sound directionality due to the two bone conduction transducers being in electrical contact with each other. With the processing of the signals prior to being sent to the transducers and the transducers able to communicate with each other, the system provides the best sound localization possible.

The appliance can include a data storage device such as a solid state memory or a flash storage device. The content of the data storage device can be encrypted for security. The linking unit can transmit encrypted data for secure transmission if desired.

The appliance may be fabricated from various polymeric or a combination of polymeric and metallic materials using any number of methods, such as computer-aided machining processes using computer numerical control (CNC) systems or three-dimensional printing processes, e.g., stereolithography apparatus (SLA), selective laser sintering (SLS), and/or other similar processes utilizing three-dimensional geometry of the patient's dentition, which may be obtained via any number of techniques. Such techniques may include use of scanned dentition using intra-oral scanners such as laser, white light, ultrasound, mechanical three-dimensional touch scanners, magnetic resonance imaging (MRI), computed tomography (CT), other optical methods, etc.

In forming the removable oral appliance, the appliance may be optionally formed such that it is molded to fit over the dentition and at least a portion of the adjacent gingival tissue to inhibit the entry of food, fluids, and other debris into the oral appliance and between the transducer assembly and tooth surface. Moreover, the greater surface area of the oral appliance may facilitate the placement and configuration of the assembly onto the appliance.

Additionally, the removable oral appliance may be optionally fabricated to have a shrinkage factor such that when placed onto the dentition, oral appliance may be configured to securely grab onto the tooth or teeth as the appliance may have a resulting size slightly smaller than the scanned tooth or teeth upon which the appliance was formed. The fitting may result in a secure interference fit between the appliance and underlying dentition.

In one variation, an extra-buccal transmitter assembly located outside the patient's mouth may be utilized to receive auditory signals for processing and transmission via a wireless signal to the electronics and/or transducer assembly positioned within the patient's mouth, which may then process and transmit the processed auditory signals via vibratory conductance to the underlying tooth and consequently to the patient's inner ear. The transmitter assembly, as described in further detail below, may contain a microphone assembly as well as a transmitter assembly and may be configured in any number of shapes and forms worn by the user, such as a watch, necklace, lapel, phone, belt-mounted device, etc.

Figure 7A:
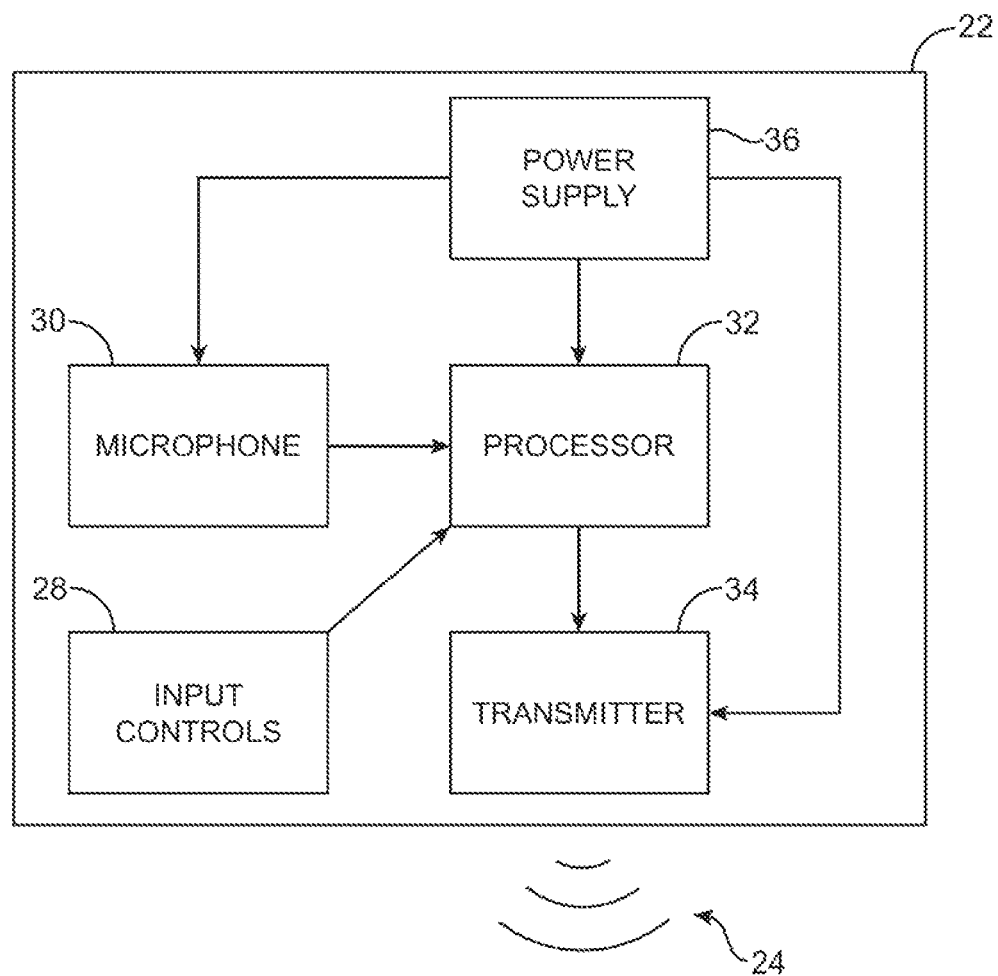
FIG. 7A shows an illustrative configuration of the individual components in a variation of the oral appliance device having an external transmitting assembly with a receiving and transducer assembly within the mouth.
Figure 7A:
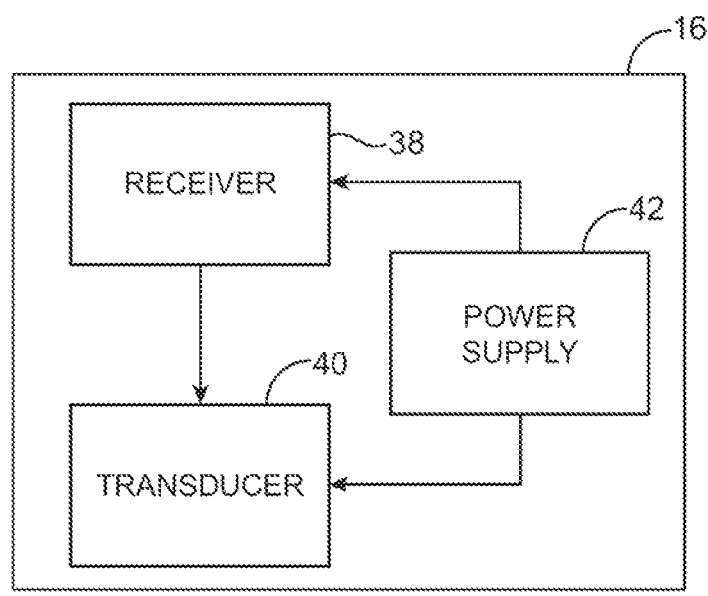
Figure 7B:
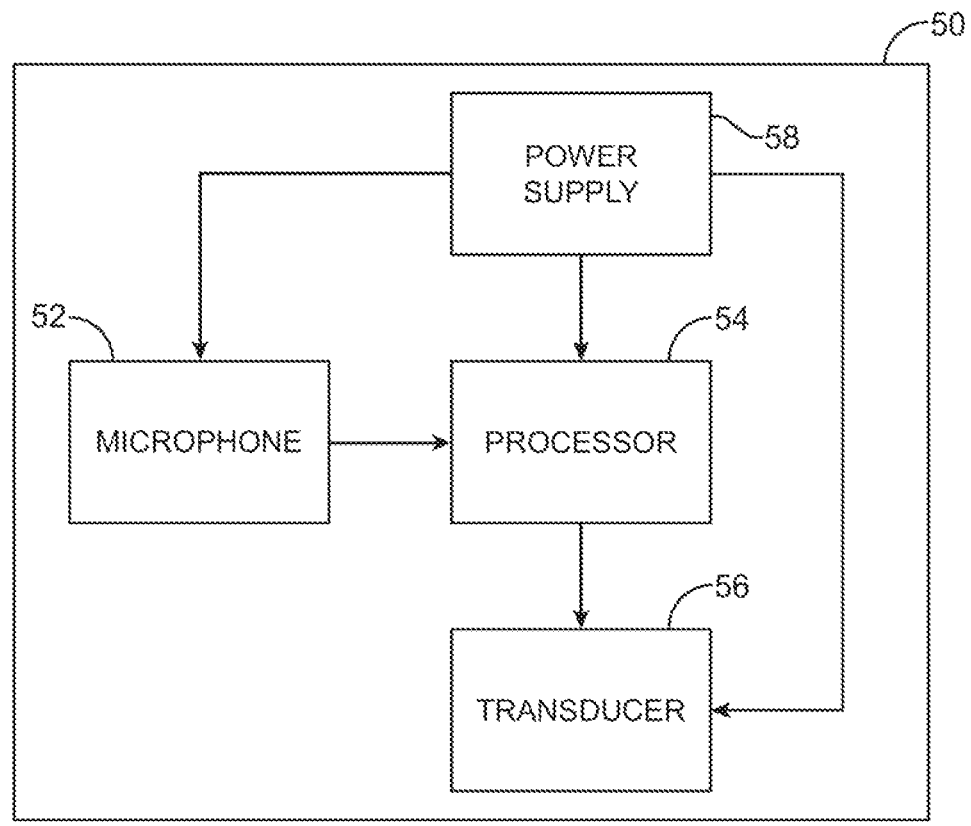
FIG. 7B shows an illustrative configuration of another variation of the device in which the entire assembly is contained by the oral appliance within the user's mouth.

FIG. 7A illustrates a schematic representation of one variation of two-way communication assembly 14 utilizing an extra-buccal transmitter assembly 22, which may generally comprise microphone 30 for receiving sounds and which is electrically connected to processor 32 for processing the auditory signals. Processor 32 may be connected electrically to transmitter 34 for transmitting the processed signals to the electronics and/or transducer assembly 16 disposed upon or adjacent to the user's teeth. The microphone 30 and processor 32 may be configured to detect and process auditory signals in any practicable range, but may be configured in one variation to detect auditory signals ranging from, e.g., 250 Hertz to 20,000 Hertz.

With respect to microphone 30, a variety of various microphone systems may be utilized. For instance, microphone 30 may be a digital, analog, and/or directional type microphone. Such various types of microphones may be interchangeably configured to be utilized with the assembly, if so desired.

Power supply 36 may be connected to each of the components in transmitter assembly 22 to provide power thereto. The transmitter signals 24 may be in any wireless form utilizing, e.g., radio frequency, ultrasound, microwave, Blue Tooth® (BLUETOOTH SIG, INC., Bellevue, Wash.), etc. for transmission to assembly 16. Assembly 22 may also optionally include one or more input controls 28 that a user may manipulate to adjust various acoustic parameters of the electronics and/or transducer assembly 16, such as acoustic focusing, volume control, filtration, muting, frequency optimization, sound adjustments, and tone adjustments, etc.

The signals transmitted 24 by transmitter 34 may be received by electronics and/or transducer assembly 16 via receiver 38, which may be connected to an internal processor for additional processing of the received signals. The received signals may be communicated to transducer 40, which may vibrate correspondingly against a surface of the tooth to conduct the vibratory signals through the tooth and bone and subsequently to the middle ear to facilitate hearing of the user. Transducer 40 may be configured as any number of different vibratory mechanisms. For instance, in one variation, transducer 40 may be an electromagnetically actuated transducer. In other variations, transducer 40 may be in the form of a piezoelectric crystal having a range of vibratory frequencies, e.g., between 250 to 4000 Hz.

Power supply 42 may also be included with assembly 16 to provide power to the receiver, transducer, and/or processor, if also included. Although power supply 42 may be a simple battery, replaceable or permanent, other variations may include a power supply 42 which is charged by inductance via an external charger. Additionally, power supply 42 may alternatively be charged via direct coupling to an alternating current (AC) or direct current (DC) source. Other variations may include a power supply 42 which is charged via a mechanical mechanism, such as an internal pendulum or slidable electrical inductance charger as known in the art, which is actuated via, e.g., motions of the jaw and/or movement for translating the mechanical motion into stored electrical energy for charging power supply 42.

In another variation of assembly 16, rather than utilizing an extra-buccal transmitter, two-way communication assembly 50 may be configured as an independent assembly contained entirely within the user's mouth, as shown in FIG. 5. Accordingly, assembly 50 may include an internal microphone 52 in communication with an on-board processor 54. Internal microphone 52 may comprise any number of different types of microphones, as described above. Processor 54 may be used to process any received auditory signals for filtering and/or amplifying the signals and transmitting them to transducer 56, which is in vibratory contact against the tooth surface. Power supply 58, as described above, may also be included within assembly 50 for providing power to each of the components of assembly 50 as necessary.

In order to transmit the vibrations corresponding to the received auditory signals efficiently and with minimal loss to the tooth or teeth, secure mechanical contact between the transducer and the tooth is ideally maintained to ensure efficient vibratory communication. Accordingly, any number of mechanisms may be utilized to maintain this vibratory communication.

Figure 8A:
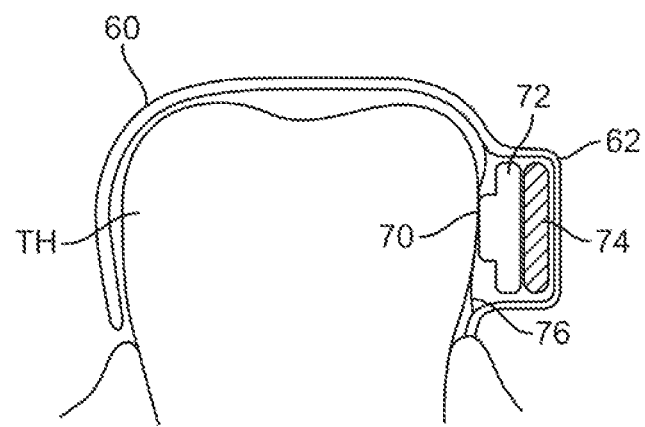
FIG. 8A shows a partial cross-sectional view of another variation of an oral appliance placed upon a tooth with an electronics/transducer assembly pressed against the tooth surface via an osmotic pouch.

Aside from an adhesive film, another alternative may utilize an expandable or swellable member to ensure a secure mechanical contact of the transducer against the tooth. As shown in FIG. 8A, an osmotic patch or expandable hydrogel 74 may be placed between housing 62 and electronics and/or transducer assembly 72. After placement of oral appliance 60, hydrogel 74 may absorb some fluids, either from any surrounding fluid or from a fluid introduced into hydrogel 74, such that hydrogel 74 expands in size to force assembly 72 into contact against the tooth surface. Assembly 72 may be configured to define a contact surface 70 having a relatively smaller contact area to facilitate uniform contact of the surface 70 against the tooth. Such a contact surface 70 may be included in any of the variations described herein. Additionally, a thin encapsulating layer or surface 76 may be placed over housing 62 between contact surface 70 and the underlying tooth to prevent any debris or additional fluids from entering housing 62.

Figure 8B:
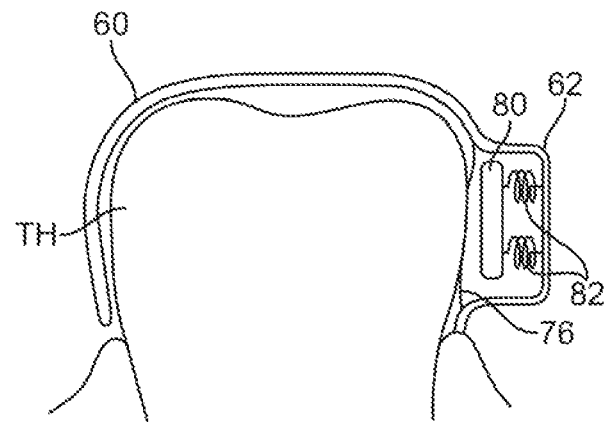
FIG. 8B shows a partial cross-sectional view of another variation of an oral appliance placed upon a tooth with an electronics/transducer assembly pressed against the tooth surface via one or more biasing elements.

Another variation is shown in FIG. 8B, which shows electronics and/or transducer assembly 80 contained within housing 62. In this variation, one or more biasing elements 82, e.g., springs, pre-formed shape memory elements, etc., may be placed between assembly 80 and housing 62 to provide a pressing force on assembly 80 to urge the device against the underlying tooth surface, thereby ensuring mechanical contact.

Figure 9:
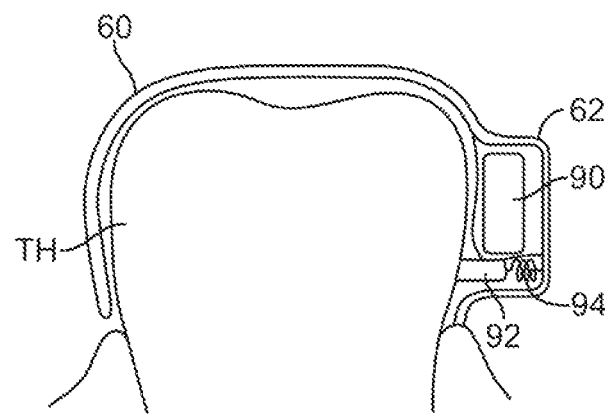
FIG. 9 illustrates another variation of an oral appliance having an electronics assembly and a transducer assembly separated from one another within the electronics and transducer housing of the oral appliance.

In yet another variation, the electronics may be contained as a separate assembly 90 which is encapsulated within housing 62 and the transducer 92 may be maintained separately from assembly 90 but also within housing 62. As shown in FIG. 9, transducer 92 may be urged against the tooth surface via a spring or other biasing element 94 and actuated via any of the mechanisms described above.

Figure 10:
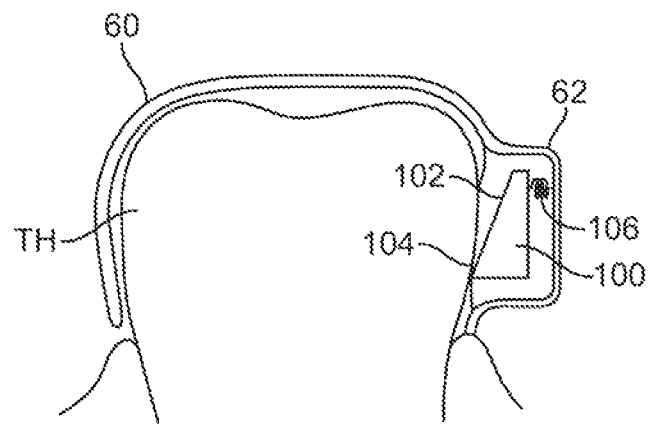
FIGS. 10 and 11 illustrate additional variations of oral appliances in which the electronics and transducer assembly are maintainable against the tooth surface via a ramped surface and a biasing element.

In other variations as shown in FIG. 10, electronics and/or transducer assembly 100 may be configured to have a ramped surface 102 in apposition to the tooth surface. The surface 102 may be angled away from the occlusal surface of the tooth. The assembly 100 may be urged via a biasing element or spring 106 which forces the ramped surface 102 to pivot about a location 104 into contact against the tooth to ensure contact for the transducer against the tooth surface.

Figure 11:
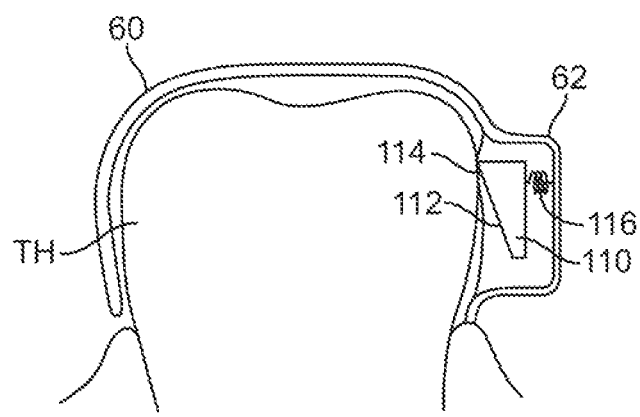

FIG. 11 illustrates another similar variation in electronics and/or transducer assembly 110 also having a ramped surface 112 in apposition to the tooth surface. In this variation, the ramped surface 112 may be angled towards the occlusal surface of the tooth. Likewise, assembly 110 may be urged via a biasing element or spring 116 which urges the assembly 110 to pivot about its lower end such that the assembly 110 contacts the tooth surface at a region 114.

Figure 12:
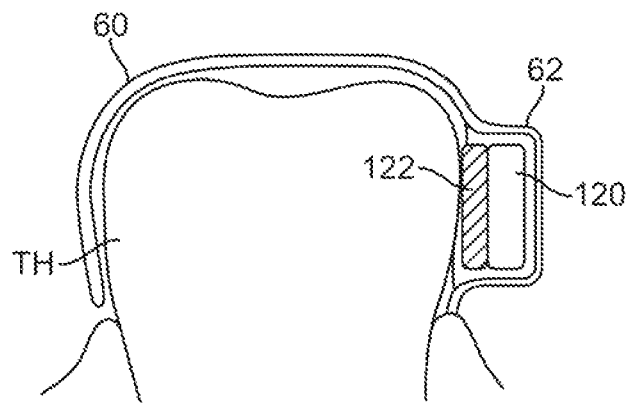
FIG. 12 shows yet another variation of an oral appliance having an interfacing member positioned between the electronics and/or transducer assembly and the tooth surface.

In yet another variation shown in FIG. 12, electronics and/or transducer assembly 120 may be positioned within housing 62 with an interface layer 122 positioned between the assembly 120 and the tooth surface. Interface layer 122 may be configured to conform against the tooth surface and against assembly 120 such that vibrations may be transmitted through layer 122 and to the tooth in a uniform manner. Accordingly, interface layer 122 may be made from a material which attenuates vibrations minimally. Interface layer 122 may be made in a variety of forms, such as a simple insert, an O-ring configuration, etc. or even in a gel or paste form, such as denture or oral paste, etc. Additionally, layer 122 may be fabricated from various materials, e.g., hard plastics or polymeric materials, metals, etc.

Figure 13:
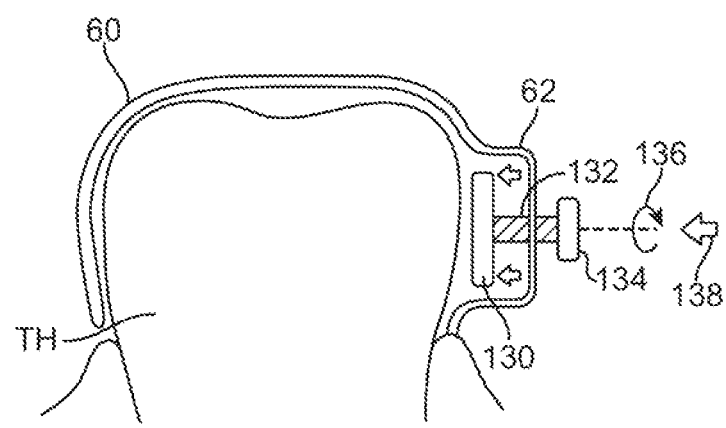
FIG. 13 shows yet another variation of an oral appliance having an actuatable mechanism for urging the electronics and/or transducer assembly against the tooth surface.

FIG. 13 illustrates yet another variation in which electronics and/or transducer assembly 130 may be urged against the tooth surface via a mechanical mechanism. As shown, assembly 130 may be attached to a structural member 132, e.g., a threaded member or a simple shaft, which is connected through housing 62 to an engagement member 134 located outside housing 62. The user may rotate engagement member 134 (as indicated by rotational arrow 136) or simply push upon member 134 (as indicated by linear arrow 138) to urge assembly 130 into contact against the tooth. Moreover, actuation of engagement member 134 may be accomplished manually within the mouth or through the user's cheek or even through manipulation via the user's tongue against engagement member 134.

Figure 14:
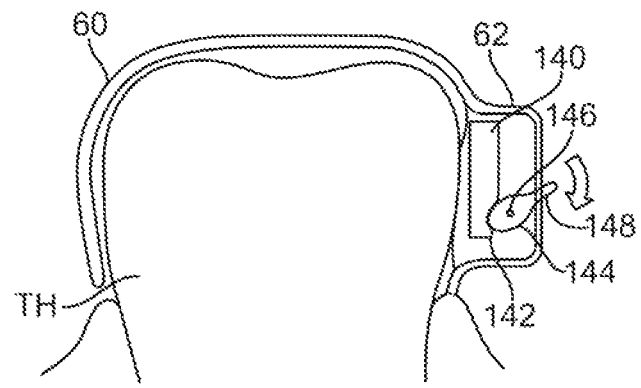
FIG. 14 shows yet another variation of an oral appliance having a cam mechanism for urging the electronics and/or transducer assembly against the tooth surface.

Another variation for a mechanical mechanism is illustrated in FIG. 14. In this variation, electronics and/or transducer assembly 140 may define a portion as an engaging surface 142 for contacting against a cam or lever mechanism 144. Cam or lever mechanism 144 may be configured to pivot 146 such that actuation of a lever 148 extending through housing 62 may urge cam or lever mechanism 144 to push against engaging surface 142 such that assembly 140 is pressed against the underlying tooth surface.

Figure 15:
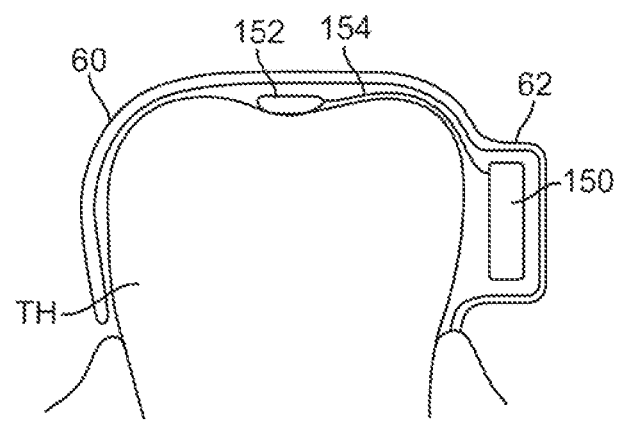
FIG. 15 shows yet another variation of an oral appliance having a separate transducer mechanism positionable upon the occlusal surface of the tooth for transmitting vibrations.

In yet another variation, the electronics 150 and the transducer 152 may be separated from one another such that electronics 150 remain disposed within housing 62 but transducer 152, connected via wire 154, is located beneath dental oral appliance 60 along an occlusal surface of the tooth, as shown in FIG. 15. In such a configuration, vibrations are transmitted via the transducer 152 through the occlusal surface of the tooth. Additionally, the user may bite down upon the oral appliance 60 and transducer 152 to mechanically compress the transducer 152 against the occlusal surface to further enhance the mechanical contact between the transducer 152 and underlying tooth to further facilitate transmission therethrough.

Figure 16:
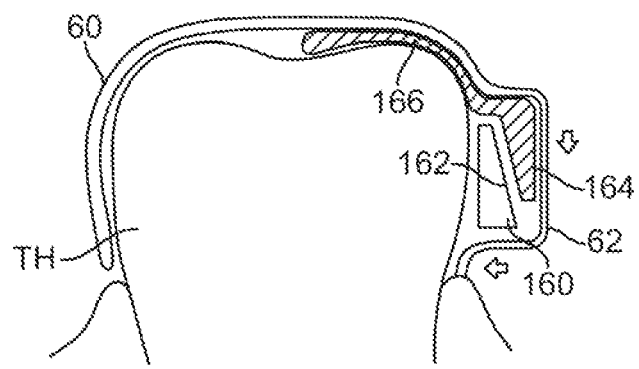
FIG. 16 illustrates another variation of an oral appliance having a mechanism for urging the electronics and/or transducer assembly against the tooth surface utilizing a bite-actuated mechanism.

In the variation of FIG. 16, another example for a bite-enhanced coupling mechanism is illustrated where electronics and/or transducer assembly 160 defines an angled interface surface 162 in apposition to a correspondingly angled engaging member 164. A proximal end of engaging member 164 may extend through housing 62 and terminate in a pusher member 166 positioned over an occlusal surface of the tooth TH. Once oral appliance 60 is initially placed over tooth TH, the user may bite down or otherwise press down upon the top portion of oral appliance 60, thereby pressing down upon pusher member 166 which in turn pushes down upon engaging member 164, as indicated by the arrow. As engaging member 164 is urged downwardly towards the gums, its angled surface may push upon the corresponding and oppositely angled surface 162 to urge assembly 160 against the tooth surface and into a secure mechanical contact.

Figure 17:
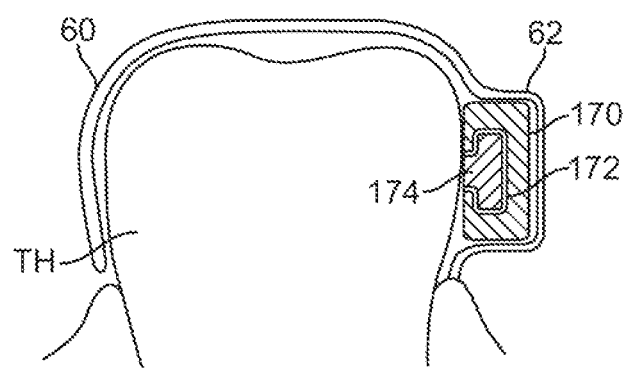
FIG. 17 shows yet another variation of an oral appliance having a composite dental anchor for coupling the transducer to the tooth.

In yet another variation, an electronics and/or transducer assembly 170 may define a channel or groove 172 along a surface for engaging a corresponding dental anchor 174, as shown in FIG. 17. Dental anchor 174 may comprise a light-curable acrylate-based composite material adhered directly to the tooth surface. Moreover dental anchor 174 may be configured in a shape which corresponds to a shape of channel or groove 172 such that the two may be interfitted in a mating engagement. In this manner, the transducer in assembly 170 may vibrate directly against dental anchor 174 which may then transmit these signals directly into the tooth TH.

Figure 18A:
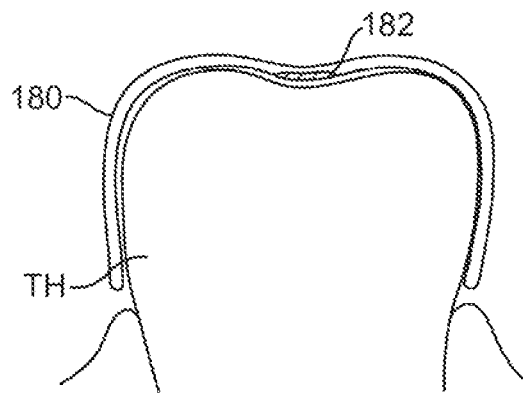
FIGS. 18A and 18B show side and top views, respectively, of an oral appliance variation having one or more transducers which may be positioned over the occlusal surface of the tooth.
Figure 18B:
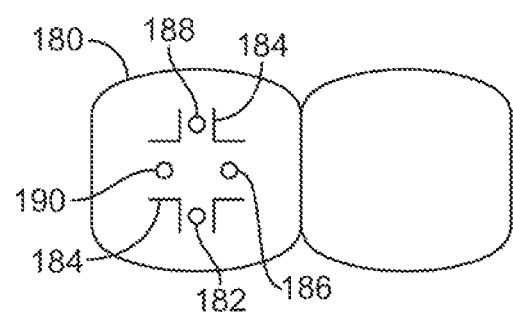

FIGS. 18A and 18B show partial cross-sectional side and top views, respectively, of another variation in which oral appliance 180 may define a number of channels or grooves 184 along a top portion of oral appliance 180. Within these channels or grooves 184, one or more transducers 182, 186, 188, 190 may be disposed such that they are in contact with the occlusal surface of the tooth and each of these transducers may be tuned to transmit frequencies uniformly. Alternatively, each of these transducers may be tuned to transmit only at specified frequency ranges. Accordingly, each transducer can be programmed or preset for a different frequency response such that each transducer may be optimized for a different frequency response and/or transmission to deliver a relatively high-fidelity sound to the user.

Figure 19A:
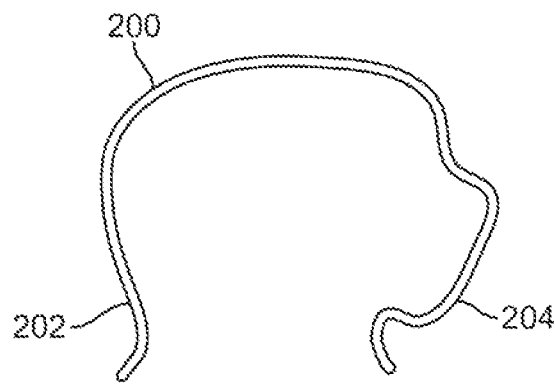
FIGS. 19A and 19B illustrate yet another variation of an oral appliance made from a shape memory material in its pre-formed relaxed configuration and its deformed configuration when placed over or upon the patient's tooth, respectively, to create an interference fit.
Figure 19B:
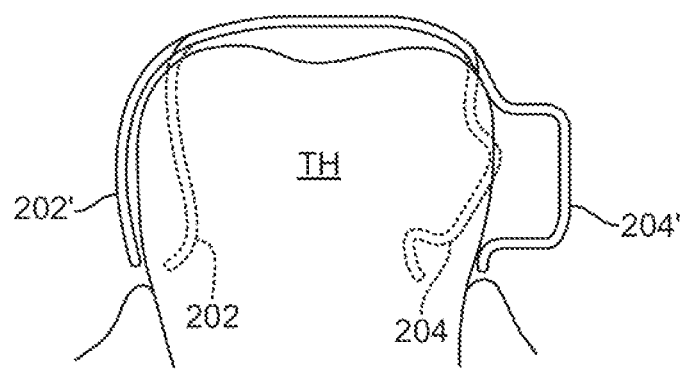

In yet another variation, FIGS. 19A and 19B illustrate an oral appliance 200 which may be pre-formed from a shape memory polymer or alloy or a superelastic material such as a Nickel-Titanium alloy, e.g., Nitinol. FIG. 19A shows oral appliance 200 in a first configuration where members 202, 204 are in an unbiased memory configuration. When placed upon or against the tooth TH, members 202, 204 may be deflected into a second configuration where members 202', 204' are deformed to engage tooth TH in a secure interference fit, as shown in FIG. 19B. The biased member 204' may be utilized to press the electronics and/or transducer assembly contained therein against the tooth surface as well as to maintain securement of the oral appliance 200 upon the tooth TH.

Figure 20:
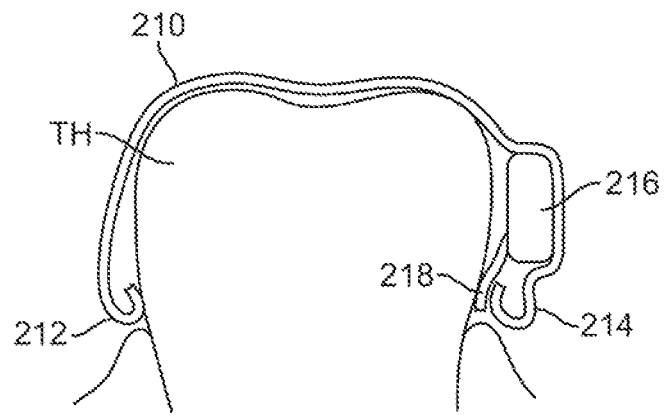
FIG. 20 illustrates yet another variation of an oral appliance made from a pre-formed material in which the transducer may be positioned between the biased side of the oral appliance and the tooth surface.

Similarly, as shown in FIG. 20, removable oral appliance 210 may have biased members to secure engage the tooth TH, as above. In this variation, the ends of the members 212, 214 may be configured into curved portions under which a transducer element 218 coupled to electronics assembly 216 may be wedged or otherwise secured to ensure mechanical contact against the tooth surface.

Figure 21:
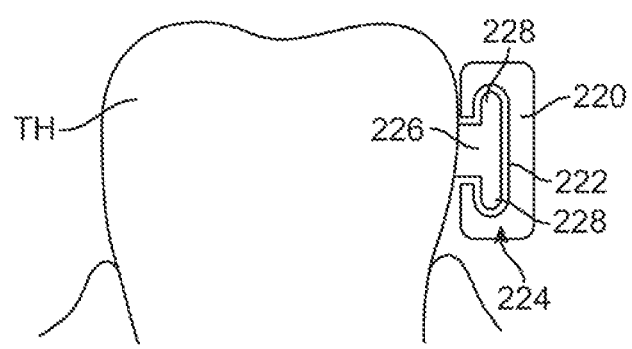
FIG. 21 illustrates a variation in which the oral appliance may be omitted and the electronics and/or transducer assembly may be attached to a composite dental anchor attached directly to the tooth surface.

FIG. 21 shows yet another variation in which the oral appliance is omitted entirely. Here, a composite dental anchor or bracket 226, as described above, may be adhered directly onto the tooth surface. Alternatively, bracket 226 may be comprised of a biocompatible material, e.g., stainless steel, Nickel-Titanium, Nickel, ceramics, composites, etc., formed into a bracket and anchored onto the tooth surface. The bracket 226 may be configured to have a shape 228 over which an electronics and/or transducer assembly 220 may be slid over or upon via a channel 222 having a corresponding receiving configuration 224 for engagement with bracket 226. In this manner, assembly 220 may be directly engaged against bracket 226, through which a transducer may directly vibrate into the underlying tooth TH. Additionally, in the event that assembly 220 is removed from the tooth TH, assembly 220 may be simply slid or rotated off bracket 226 and a replacement assembly may be put in its place upon bracket 226.

Figure 22A:
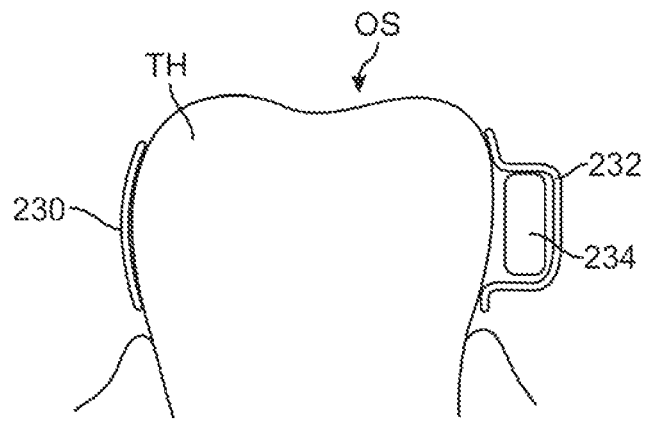
FIGS. 22A and 22B show partial cross-sectional side and perspective views, respectively, of another variation of an oral appliance assembly having its occlusal surface removed or omitted for patient comfort.
Figure 22B:
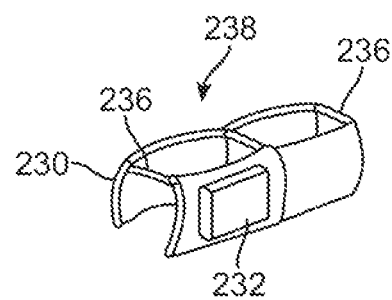

FIGS. 22A and 22B show partial cross-sectional side and perspective views, respectively, of yet another variation of an oral appliance 230. In this variation, the oral appliance 230 may be configured to omit an occlusal surface portion of the oral appliance 230 and instead engages the side surfaces of the tooth TH, such as the lingual and buccal surfaces only. The electronics and/or transducer assembly 234 may be contained, as above, within a housing 232 for contact against the tooth surface. Additionally, as shown in FIG. 22B, one or more optional cross-members 236 may connect the side portions of the oral appliance 230 to provide some structural stability when placed upon the tooth. This variation may define an occlusal surface opening 238 such that when placed upon the tooth, the user may freely bite down directly upon the natural occlusal surface of the tooth unobstructed by the oral appliance device, thereby providing for enhanced comfort to the user.

Figure 23A:
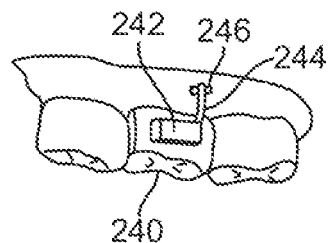
FIGS. 23A and 23B illustrate perspective and side views, respectively, of an oral appliance which may be coupled to a screw or post implanted directly into the underlying bone, such as the maxillary or mandibular bone.
Figure 23B:
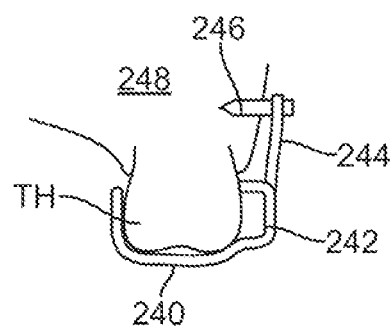

In yet other variations, vibrations may be transmitted directly into the underlying bone or tissue structures rather than transmitting directly through the tooth or teeth of the user. As shown in FIG. 23A, an oral appliance 240 is illustrated positioned upon the user's tooth, in this example upon a molar located along the upper row of teeth. The electronics and/or transducer assembly 242 is shown as being located along the buccal surface of the tooth. Rather than utilizing a transducer in contact with the tooth surface, a conduction transmission member 244, such as a rigid or solid metallic member, may be coupled to the transducer in assembly 242 and extend from oral appliance 240 to a post or screw 246 which is implanted directly into the underlying bone 248, such as the maxillary bone, as shown in the partial cross-sectional view of FIG. 23B. As the distal end of transmission member 244 is coupled directly to post or screw 246, the vibrations generated by the transducer may be transmitted through transmission member 244 and directly into post or screw 246, which in turn transmits the vibrations directly into and through the bone 248 for transmission to the user's inner ear.

Figure 24:
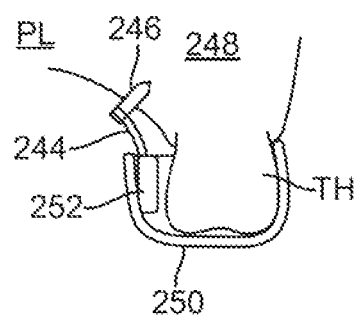
FIG. 24 illustrates another variation in which the oral appliance may be coupled to a screw or post implanted directly into the palate of a patient.

FIG. 24 illustrates a partial cross-sectional view of an oral appliance 250 placed upon the user's tooth TH with the electronics and/or transducer assembly 252 located along the lingual surface of the tooth. Similarly, the vibrations may be transmitted through the conduction transmission member 244 and directly into post or screw 246, which in this example is implanted into the palatine bone PL. Other variations may utilize this arrangement located along the lower row of teeth for transmission to a post or screw 246 drilled into the mandibular bone.

Figure 25A:
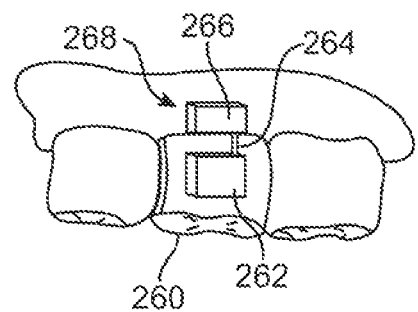
FIGS. 25A and 25B illustrate perspective and side views, respectively, of an oral appliance which may have its transducer assembly or a coupling member attached to the gingival surface to conduct vibrations through the gingival tissue and underlying bone.
Figure 25B:
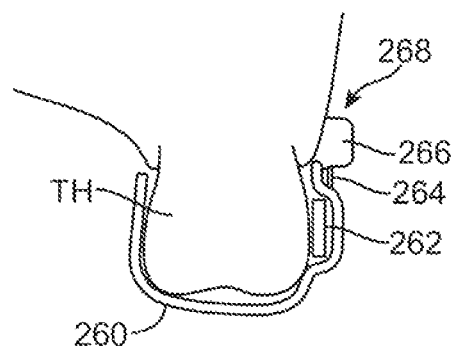

In yet another variation, rather utilizing a post or screw drilled into the underlying bone itself, a transducer may be attached, coupled, or otherwise adhered directly to the gingival tissue surface adjacent to the teeth. As shown in FIGS. 25A and 25B, an oral appliance 260 may have an electronics assembly 262 positioned along its side with an electrical wire 264 extending therefrom to a transducer assembly 266 attached to the gingival tissue surface 268 next to the tooth TH. Transducer assembly 266 may be attached to the tissue surface 268 via an adhesive, structural support arm extending from oral appliance 260, a dental screw or post, or any other structural mechanism. In use, the transducer may vibrate and transmit directly into the underlying gingival tissue, which may conduct the signals to the underlying bone.

Figure 26:
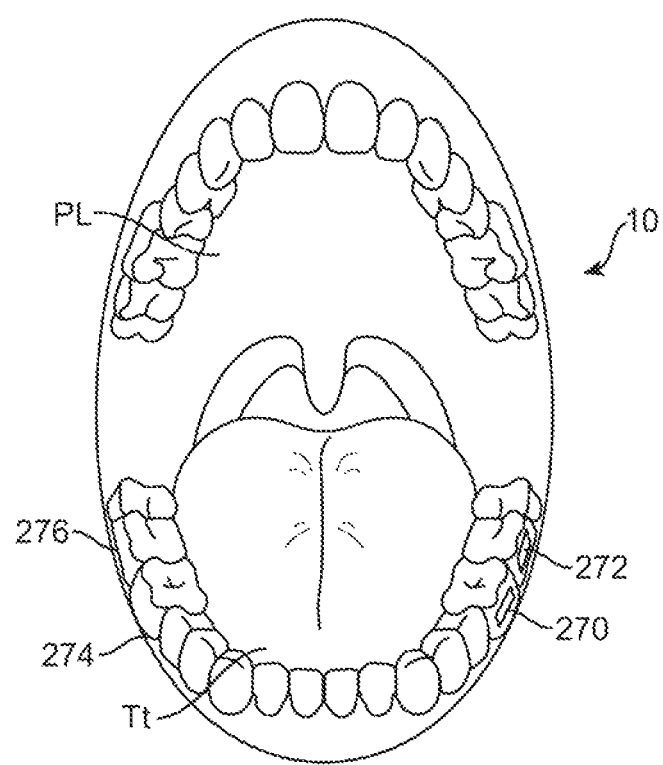
FIG. 26 illustrates an example of how multiple oral appliance two-way communication assemblies or transducers may be placed on multiple teeth throughout the patient's mouth.

For any of the variations described above, they may be utilized as a single device or in combination with any other variation herein, as practicable, to achieve the desired hearing level in the user. Moreover, more than one oral appliance device and electronics and/or transducer assemblies may be utilized at any one time. For example, FIG. 26 illustrates one example where multiple transducer assemblies 270, 272, 274, 276 may be placed on multiple teeth. Although shown on the lower row of teeth, multiple assemblies may alternatively be positioned and located along the upper row of teeth or both rows as well. Moreover, each of the assemblies may be configured to transmit vibrations within a uniform frequency range. Alternatively in other variations, different assemblies may be configured to vibrate within non-overlapping frequency ranges between each assembly. As mentioned above, each transducer 270, 272, 274, 276 can be programmed or preset for a different frequency response such that each transducer may be optimized for a different frequency response and/or transmission to deliver a relatively high-fidelity sound to the user.

Moreover, each of the different transducers 270, 272, 274, 276 can also be programmed to vibrate in a manner which indicates the directionality of sound received by the microphone worn by the user. For example, different transducers positioned at different locations within the user's mouth can vibrate in a specified manner by providing sound or vibrational queues to inform the user which direction a sound was detected relative to an orientation of the user. For instance, a first transducer located, e.g., on a user's left tooth, can be programmed to vibrate for sound detected originating from the user's left side. Similarly, a second transducer located, e.g., on a user's right tooth, can be programmed to vibrate for sound detected originating from the user's right side. Other variations and queues may be utilized as these examples are intended to be illustrative of potential variations.

Figure 27A:
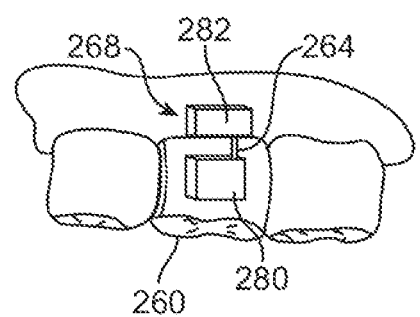
FIGS. 27A and 27B illustrate perspective and side views, respectively, of an oral appliance (similar to a variation shown above) which may have a microphone unit positioned adjacent to or upon the gingival surface to physically separate the microphone from the transducer to attenuate or eliminate feedback.
Figure 27B:
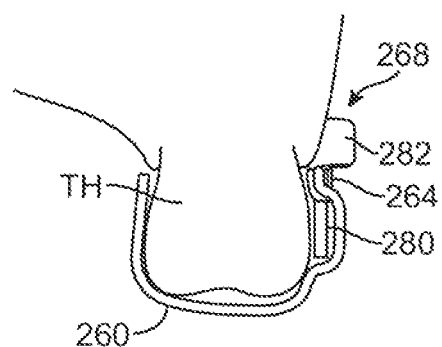

In variations where the one or more microphones are positioned in intra-buccal locations, the microphone may be integrated directly into the electronics and/or transducer assembly, as described above. However, in additional variation, the microphone unit may be positioned at a distance from the transducer assemblies to minimize feedback. In one example, similar to a variation shown above, microphone unit 282 may be separated from electronics and/or transducer assembly 280, as shown in FIGS. 27A and 27B. In such a variation, the microphone unit 282 positioned upon or adjacent to the gingival surface 268 may be electrically connected via wire(s) 264.

Figure 28:
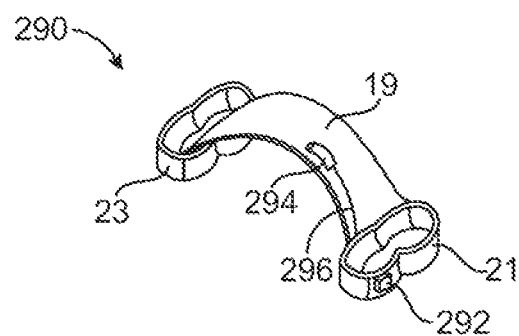
FIG. 28 illustrates another variation of a removable oral appliance supported by an arch and having a microphone unit integrated within the arch.

Although the variation illustrates the microphone unit 282 placed adjacent to the gingival tissue 268, unit 282 may be positioned upon another tooth or another location within the mouth. For instance, FIG. 28 illustrates another variation 290 which utilizes an arch 19 connecting one or more tooth retaining portions 21, 23, as described above. However, in this variation, the microphone unit 294 may be integrated within or upon the arch 19 separated from the transducer assembly 292. One or more wires 296 routed through arch 19 may electrically connect the microphone unit 294 to the assembly 292. Alternatively, rather than utilizing a wire 296, microphone unit 294 and assembly 292 may be wirelessly coupled to one another, as described above.

Figure 29:
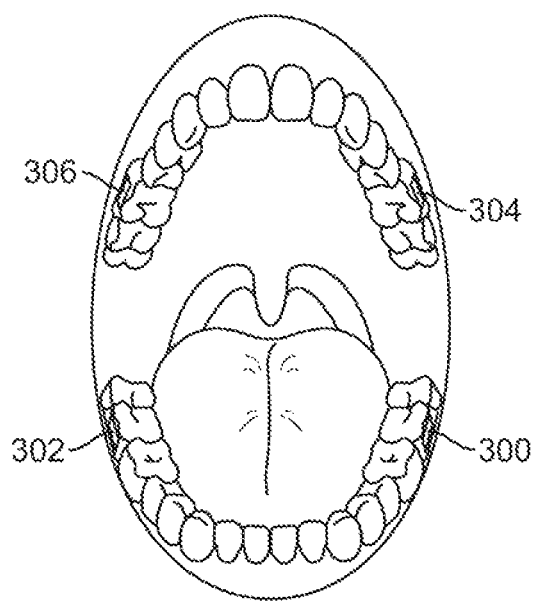
FIG. 29 shows yet another variation illustrating at least one microphone and optionally additional microphone units positioned around the user's mouth and in wireless communication with the electronics and/or transducer assembly.

In yet another variation for separating the microphone from the transducer assembly, FIG. 29 illustrates another variation where at least one microphone 302 (or optionally any number of additional microphones 304, 306) may be positioned within the mouth of the user while physically separated from the electronics and/or transducer assembly 300. In this manner, the one or optionally more microphones 302, 304, 306 may be wirelessly coupled to the electronics and/or transducer assembly 300 in a manner which attenuates or eliminates feedback, if present, from the transducer.

The applications of the devices and methods discussed above are not limited to the treatment of hearing loss but may include any number of further treatment applications. Moreover, such devices and methods may be applied to other treatment sites within the body. Modification of the above-described assemblies and methods for carrying out the invention, combinations between different variations as practicable, and variations of aspects of the invention that are obvious to those of skill in the art are intended to be within the scope of the claims.

What is claimed is:

1. An intra-oral appliance for transmitting vibrations, comprising:
    a. an actuator to provide bone conduction sound transmission;
    b. a transceiver in communication with the actuator to cause the actuator to generate sound; and
    c. a first chamber containing the actuator and the transceiver, said first chamber adapted to be coupled to one or more teeth by producing an interference fit between the first chamber and at least two surfaces of the one or more teeth.

2. The appliance of claim 1, comprising an actuator driver or amplifier coupled to the actuator.

3. The appliance of claim 1, comprising a second chamber to house a power source to drive the actuator and the transceiver.

4. The appliance of claim 3, comprising a bridge coupling the first and second chambers.

5. The appliance of claim 4, wherein the bridge comprises a thickness of about two millimeters or less.

6. The appliance of claim 4, wherein the bridge comprises one of: a wired frame, a polymeric material, a combination of polymeric material and a wired frame.

7. The appliance of claim 1, comprising a mass coupled to the actuator.

8. The appliance of claim 7, wherein the mass comprises one of a weight, a battery, an electronics module.

9. The appliance of claim 1, wherein the actuator comprises a piezoelectric transducer.

10. The appliance of claim 1, wherein the actuator comprises a rectangular beam bender.

11. The appliance of claim 1, comprising one or more ceramic or alumina stands coupled to the actuator.

12. The appliance of claim 1, comprising a compressible material coupled to the actuator.

13. The appliance of claim 12, comprising a non-compressible material covering the actuator and the compressible material.

14. The appliance of claim 1, comprising a rechargeable power source coupled to the transceiver and the actuator.

15. The appliance of claim 14, comprising an inductive charger coupled to the battery.

16. The appliance of claim 1, wherein the chamber comprises a custom oral device.

17. The appliance of claim 1, comprising a pre-built housing for the actuator.

18. The appliance of claim 17, wherein the pre-built housing comprises an arm and one or more bottom contacts, the arm and the contacts adapted to bias a mass against a tooth.

19. The appliance of claim 1, wherein the chamber comprises a thickness of about six millimeter or less.

20. The appliance of claim 1, wherein the chamber comprises a length of about twenty millimeters or less.

21. The appliance of claim 1, wherein the chamber comprises a width of about fifteen millimeters or less.

* * * * *